US010341890B2

(12) United States Patent
Chen et al.

(10) Patent No.: US 10,341,890 B2
(45) Date of Patent: Jul. 2, 2019

(54) CSI FEEDBACK IN LTE/LTE-ADVANCED SYSTEMS WITH UNLICENSED SPECTRUM

(71) Applicant: QUALCOMM Incorporated, San Diego, CA (US)

(72) Inventors: Wanshi Chen, San Diego, CA (US); Tao Luo, San Diego, CA (US); Peter Gaal, San Diego, CA (US); Durga Prasad Malladi, San Diego, CA (US); Srinivas Yerramalli, San Diego, CA (US); Yongbin Wei, San Diego, CA (US); Hao Xu, San Diego, CA (US); Tingfang Ji, San Diego, CA (US); Naga Bhushan, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 600 days.

(21) Appl. No.: 14/565,085

(22) Filed: Dec. 9, 2014

(65) Prior Publication Data
US 2015/0172950 A1    Jun. 18, 2015

Related U.S. Application Data

(60) Provisional application No. 61/916,001, filed on Dec. 13, 2013.

(51) Int. Cl.
*H04W 24/10*    (2009.01)
*H04W 16/14*    (2009.01)
(Continued)

(52) U.S. Cl.
CPC ........... *H04W 24/10* (2013.01); *H04L 5/0048* (2013.01); *H04W 16/14* (2013.01);
(Continued)

(58) Field of Classification Search
CPC ......... H04W 72/0406; H04W 74/0808; H04W 84/12
See application file for complete search history.

(56) References Cited

U.S. PATENT DOCUMENTS 8,599,708 B2    12/2013    Chen et al.
8,934,583 B1    1/2015    Qi et al.
(Continued)

FOREIGN PATENT DOCUMENTS

CN    102547872 A    7/2012
CN    102655676 A    9/2012
(Continued)

OTHER PUBLICATIONS

International Search Report and Written Opinion—PCT/US2014/069764—ISA/EPO—dated Mar. 20, 2015.
(Continued)

*Primary Examiner* — Sulaiman Nooristany
(74) *Attorney, Agent, or Firm* — Liem T. Do

(57) ABSTRACT

Channel state information (CSI) feedback in long term evolution (LTE) and LTE-Advanced (LTE-A) networks including contention-based shared unlicensed spectrum is disclosed in which a user equipment (UE) identifies at least one carrier utilizing a contention based radio frequency spectrum. The UE detects a transmission signal indicative of clear channel assessment (CCA) result information for the carrier and determines whether a reference signal for channel state information measurement is present in a subframe based on the detected transmission signal. The UE would transmit a measurement report based on this presence determination of the reference signal.

30 Claims, 14 Drawing Sheets

(51) Int. Cl.
*H04W 74/08* (2009.01)
*H04L 5/00* (2006.01)
*H04W 72/04* (2009.01)
*H04W 84/12* (2009.01)

(52) U.S. Cl.
CPC ... *H04W 72/0406* (2013.01); *H04W 74/0808* (2013.01); *H04W 72/04* (2013.01); *H04W 84/12* (2013.01)

(56) References Cited

U.S. PATENT DOCUMENTS

| | | | |
|---|---|---|---|
| 9,060,362 | B2 | 6/2015 | Harel et al. |
| 2002/0136183 | A1 | 9/2002 | Chen et al. |
| 2004/0047324 | A1 | 3/2004 | Diener |
| 2005/0152313 | A1 | 7/2005 | Cave et al. |
| 2006/0009161 | A1 | 1/2006 | Beecher |
| 2006/0046739 | A1 | 3/2006 | Blosco et al. |
| 2006/0092889 | A1 | 5/2006 | Lyons et al. |
| 2006/0176846 | A1 | 8/2006 | Miki et al. |
| 2007/0014269 | A1 | 1/2007 | Sherman et al. |
| 2007/0072638 | A1 | 3/2007 | Yang et al. |
| 2007/0242621 | A1 | 10/2007 | Nandagopalan et al. |
| 2007/0286122 | A1 | 12/2007 | Fonseca |
| 2008/0146156 | A1 | 6/2008 | Makhlouf et al. |
| 2008/0268778 | A1 | 10/2008 | De La Garrigue et al. |
| 2009/0052574 | A1 | 2/2009 | Li et al. |
| 2009/0103435 | A1 | 4/2009 | Celentano et al. |
| 2009/0252095 | A1 | 10/2009 | Lu et al. |
| 2009/0323608 | A1* | 12/2009 | Adachi ............... H04W 48/18 370/329 |
| 2010/0034159 | A1 | 2/2010 | Shin et al. |
| 2010/0034191 | A1 | 2/2010 | Schulz |
| 2010/0085930 | A1 | 4/2010 | Shin et al. |
| 2010/0232365 | A1 | 9/2010 | Lu et al. |
| 2011/0002252 | A1 | 1/2011 | Kim et al. |
| 2011/0140435 | A1* | 6/2011 | Miller ................. E02B 9/02 290/54 |
| 2011/0151793 | A1 | 6/2011 | Lee et al. |
| 2011/0170435 | A1* | 7/2011 | Kim ................... H04L 5/0023 370/252 |
| 2011/0211627 | A1* | 9/2011 | Suzuki ............... H04L 5/0007 375/224 |
| 2012/0134280 | A1 | 5/2012 | Rotvold et al. |
| 2012/0230205 | A1 | 9/2012 | An et al. |
| 2012/0257585 | A1 | 10/2012 | Sydor et al. |
| 2013/0017794 | A1 | 1/2013 | Kloper et al. |
| 2013/0100888 | A1* | 4/2013 | Shimezawa ......... H04L 5/0053 370/328 |
| 2013/0114430 | A1* | 5/2013 | Koivisto ............. H04B 7/024 370/252 |
| 2013/0157660 | A1* | 6/2013 | Awad ................. H04W 72/046 455/435.1 |
| 2013/0178220 | A1 | 7/2013 | Lee et al. |
| 2013/0182610 | A1 | 7/2013 | Pantelidou et al. |
| 2013/0194944 | A1 | 8/2013 | Soyak et al. |
| 2013/0203458 | A1* | 8/2013 | Charbit .............. H04W 52/34 455/522 |
| 2013/0208587 | A1* | 8/2013 | Bala .................. H04W 16/14 370/230 |
| 2013/0244720 | A1 | 9/2013 | Hsia et al. |
| 2013/0258989 | A1 | 10/2013 | Ribeiro et al. |
| 2013/0343336 | A1 | 12/2013 | Bai |
| 2014/0010089 | A1 | 1/2014 | Cai et al. |
| 2014/0036787 | A1 | 2/2014 | Ganu et al. |
| 2014/0038625 | A1 | 2/2014 | Palanivelu et al. |
| 2014/0056169 | A1* | 2/2014 | Jung .................. H04W 24/08 370/252 |
| 2014/0098681 | A1 | 4/2014 | Stager et al. |
| 2014/0269597 | A1* | 9/2014 | Park .................. H04J 11/005 370/329 |
| 2014/0321313 | A1* | 10/2014 | Seo ................... H04J 11/00 370/252 |
| 2014/0341058 | A1 | 11/2014 | Takano et al. |
| 2014/0341089 | A1* | 11/2014 | Ji ..................... H04L 5/0073 370/278 |
| 2014/0369212 | A1 | 12/2014 | Raravi et al. |
| 2015/0103767 | A1 | 4/2015 | Kim et al. |
| 2015/0163805 | A1* | 6/2015 | Cattoni .............. H04W 72/0453 370/329 |
| 2015/0173056 | A1 | 6/2015 | Yerramalli et al. |
| 2015/0237623 | A1 | 8/2015 | Choi et al. |
| 2015/0305075 | A1 | 10/2015 | Fodor et al. |
| 2015/0319700 | A1 | 11/2015 | Oteri et al. |
| 2015/0365960 | A1* | 12/2015 | Davydov ............ H04W 36/14 370/252 |
| 2016/0013921 | A1* | 1/2016 | Nagata .............. H04W 16/10 370/330 |
| 2016/0043949 | A1 | 2/2016 | Lee et al. |
| 2016/0174206 | A1 | 6/2016 | Xia et al. |
| 2016/0227489 | A1 | 8/2016 | Oteri et al. |
| 2016/0381565 | A1 | 12/2016 | Oteri et al. |
| 2017/0006505 | A1 | 1/2017 | Liu et al. |

FOREIGN PATENT DOCUMENTS

| | | |
|---|---|---|
| CN | 102792621 A | 11/2012 |
| JP | 2013138365 A | 7/2013 |
| JP | 2013532915 A | 8/2013 |
| JP | 2014500685 A | 1/2014 |
| JP | 2015523013 A | 8/2015 |
| WO | WO-2007108077 A1 | 9/2007 |
| WO | 2011088403 A1 | 7/2011 |
| WO | 2012078565 A1 | 6/2012 |
| WO | WO-2012109195 A2 | 8/2012 |
| WO | 2013015445 A1 | 1/2013 |
| WO | WO-2013033692 A1 | 3/2013 |
| WO | 2013089530 A1 | 6/2013 |
| WO | 2013184613 A2 | 12/2013 |
| WO | WO-2014189913 | 11/2014 |

OTHER PUBLICATIONS

Ramachandran I., et al., "Clear channel assessment in energyconstrained wideband wireless networks", IEEE Wireless Communications, IEEE Service Center, Piscataway, NJ, US, vol. 14, No. 3, Jun. 1, 2007 (Jun. 1, 2007), pp. 70-78, XP011379389, ISSN: 1536-1284, DOI: 10.1109/MWC.2007.386615.

* cited by examiner

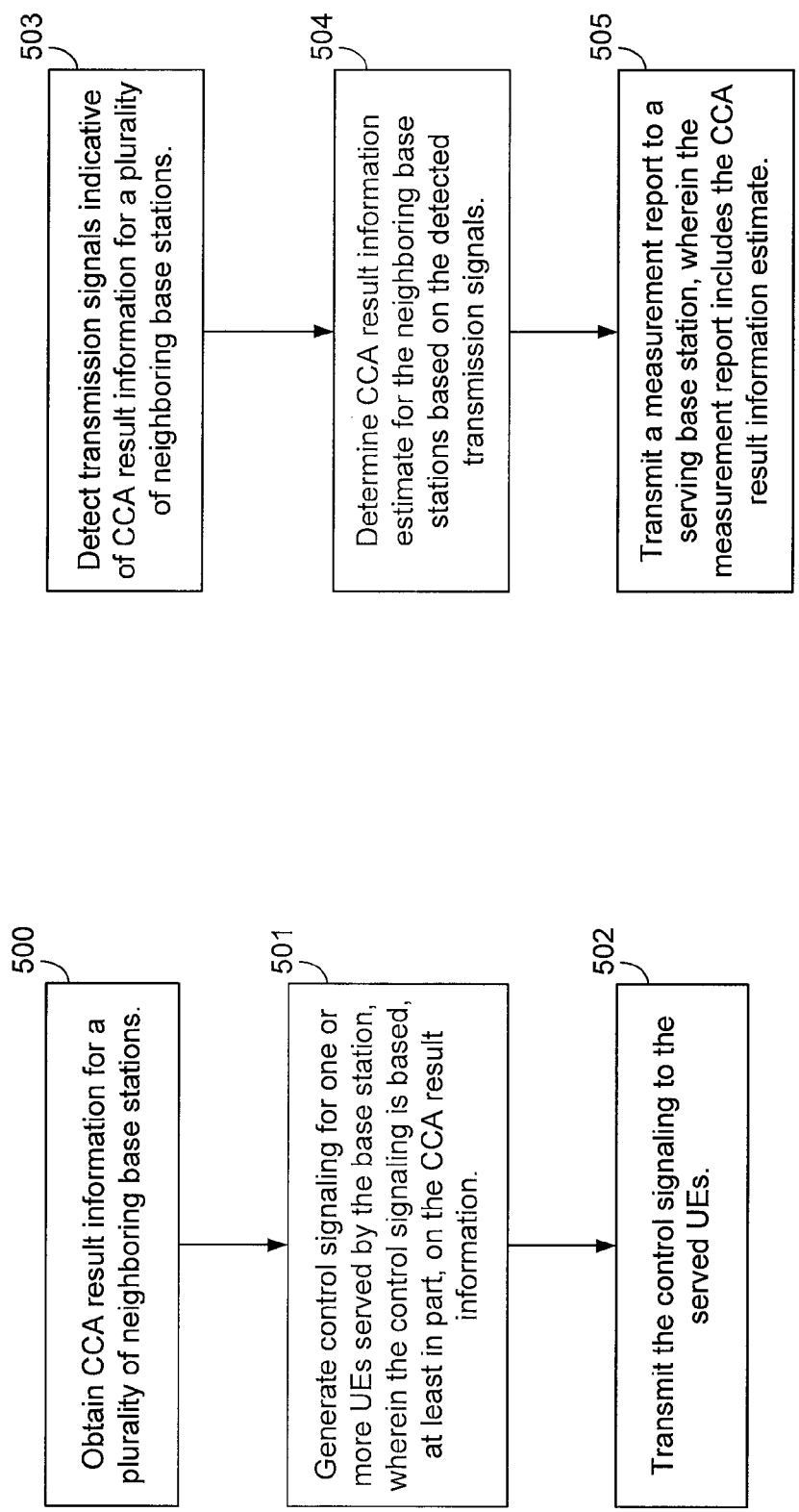

CSI FEEDBACK IN LTE/LTE-ADVANCED SYSTEMS WITH UNLICENSED SPECTRUM

CROSS-REFERENCE TO RELATED APPLICATIONS

This application claims the benefit of U.S. Provisional Patent Application No. 61/916,001, entitled, "CSI FEEDBACK IN LTE/LTE-ADVANCED SYSTEMS WITH UNLICENSED SPECTRUM," filed on Dec. 13, 2013, which is expressly incorporated by reference herein in its entirety.

BACKGROUND

Field

Aspects of the present disclosure relate generally to wireless communication systems, and more particularly, to channel state information (CSI) feedback processes for long term evolution (LTE) and LTE-Advanced (LTE-A) communication system including unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes identifying, by a UE, at least one carrier utilizing a contention based radio frequency spectrum, detecting a transmission signal indicative of clear channel assessment (CCA) result information for the at least one carrier, determining whether a reference signal for channel state information measurement is present in a subframe based on the detected transmission signal, and transmitting, by the UE, a measurement report, wherein the measurement report is based at least in part on the determining the reference signal is present.

In an additional aspect of the disclosure, an apparatus configured for wireless communication includes means for identifying, by a UE, at least one carrier utilizing a contention based radio frequency spectrum, means for detecting a transmission signal indicative of CCA result information for the at least one carrier, means for determining whether a reference signal for channel state information measurement is present in a subframe based on the detected transmission signal, and means for transmitting, by the UE, a measurement report, wherein the measurement report is based at least in part on the determining the reference signal is present.

In an additional aspect of the disclosure, a computer-readable medium having program code recorded thereon. This program code includes code to identify, by a UE, at least one carrier utilizing a contention based radio frequency spectrum, code to detect a transmission signal indicative of CCA result information for the at least one carrier, code to determine whether a reference signal for channel state information measurement is present in a subframe based on the detected transmission signal, and code to transmit, by the UE, a measurement report, wherein the measurement report is based at least in part on the determining the reference signal is present.

In an additional aspect of the disclosure, an apparatus includes at least one processor and a memory coupled to the processor. The processor is configured to identify, by a UE, at least one carrier utilizing a contention based radio frequency spectrum, to detect a transmission signal indicative of CCA result information for the at least one carrier, to determine whether a reference signal for channel state information measurement is present in a subframe based on the detected transmission signal, and to transmit, by the UE, a measurement report, wherein the measurement report is based at least in part on the determining the reference signal is present.

In an additional aspect of the disclosure, a method of wireless communication includes obtaining, by a base station, CCA result information for a plurality of neighboring base stations, generating, by the base station, control signaling for one or more UEs served by the base station, wherein the control signaling is based, at least in part, on the CCA result information, and transmitting the control signaling to the one or more UEs.

In an additional aspect of the disclosure, a method of wireless communication including detecting, by a UE, transmission signals indicative of CCA result information for a plurality of neighboring base stations, determining, by the UE, CCA result information estimate for the plurality of neighboring base stations based on the transmission signals indicative of CCA result information, and transmitting, by the UE, a measurement report to a serving base station, wherein the measurement report includes the CCA result information estimate.

In an additional aspect of the disclosure, an apparatus configured for wireless communication includes means for obtaining, by a base station, CCA result information for a plurality of neighboring base stations, means for generating, by the base station, control signaling for one or more UEs served by the base station, wherein the control signaling is based, at least in part, on the CCA result information, and means for transmitting the control signaling to the one or more UEs.

In an additional aspect of the disclosure, an apparatus configured for wireless communication including means for detecting, by a UE, transmission signals indicative of CCA result information for a plurality of neighboring base stations, means for determining, by the UE, CCA result information estimate for the plurality of neighboring base stations based on the transmission signals indicative of CCA result information, and means for transmitting, by the UE, a measurement report to a serving base station, wherein the measurement report includes the CCA result information estimate.

In an additional aspect of the disclosure, a computer-readable medium having program code recorded thereon. This program code includes code to obtain, by a base station, CCA result information for a plurality of neighboring base stations, code to generate, by the base station, control signaling for one or more UEs served by the base station, wherein the control signaling is based, at least in part, on the CCA result information, and code to transmit the control signaling to the one or more UEs.

In an additional aspect of the disclosure, a computer-readable medium having program code recorded thereon. This program code includes code to detect, by a UE, transmission signals indicative of CCA result information for a plurality of neighboring base stations, code to determine, by the UE, CCA result information estimate for the plurality of neighboring base stations based on the transmission signals indicative of CCA result information, and code to transmit, by the UE, a measurement report to a serving base station, wherein the measurement report includes the CCA result information estimate.

In an additional aspect of the disclosure, an apparatus includes at least one processor and a memory coupled to the processor. The processor is configured to obtain, by a base station, CCA result information for a plurality of neighboring base stations, to generate, by the base station, control signaling for one or more UEs served by the base station, wherein the control signaling is based, at least in part, on the CCA result information, and to transmit the control signaling to the one or more UEs.

In an additional aspect of the disclosure, an apparatus includes at least one processor and a memory coupled to the processor. The processor is configured to detect, by a UE, transmission signals indicative of CCA result information for a plurality of neighboring base stations, to determine, by the UE, CCA result information estimate for the plurality of neighboring base stations based on the transmission signals indicative of CCA result information, and to transmit, by the UE, a measurement report to a serving base station, wherein the measurement report includes the CCA result information estimate.

BRIEF DESCRIPTION OF THE DRAWINGS

FIGS. 5A and 5B are functional block diagrams illustrating example blocks executed to implement aspects of the present disclosure.

DETAILED DESCRIPTION

Figure 1:
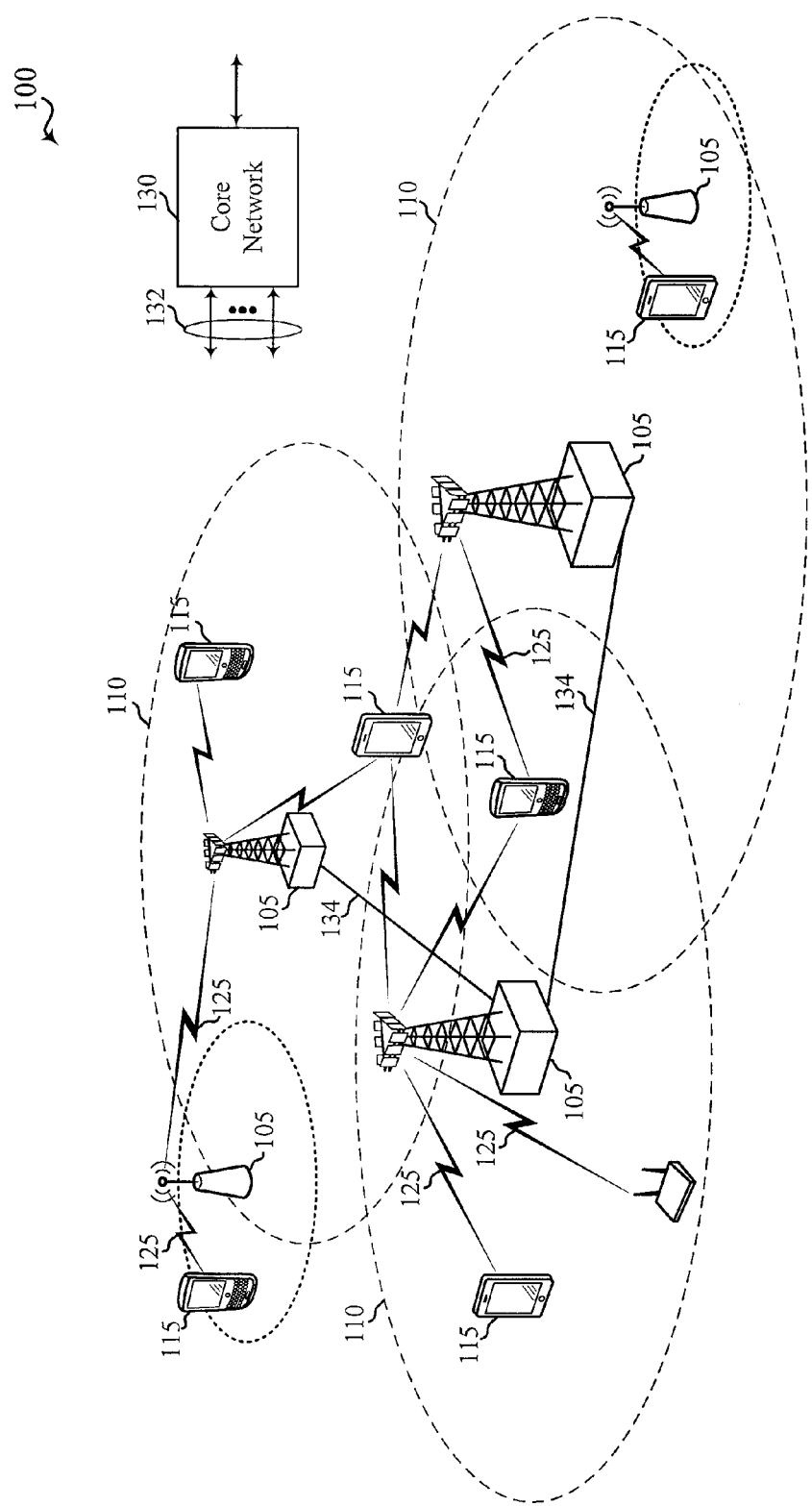
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-11B.

Figure 2A:
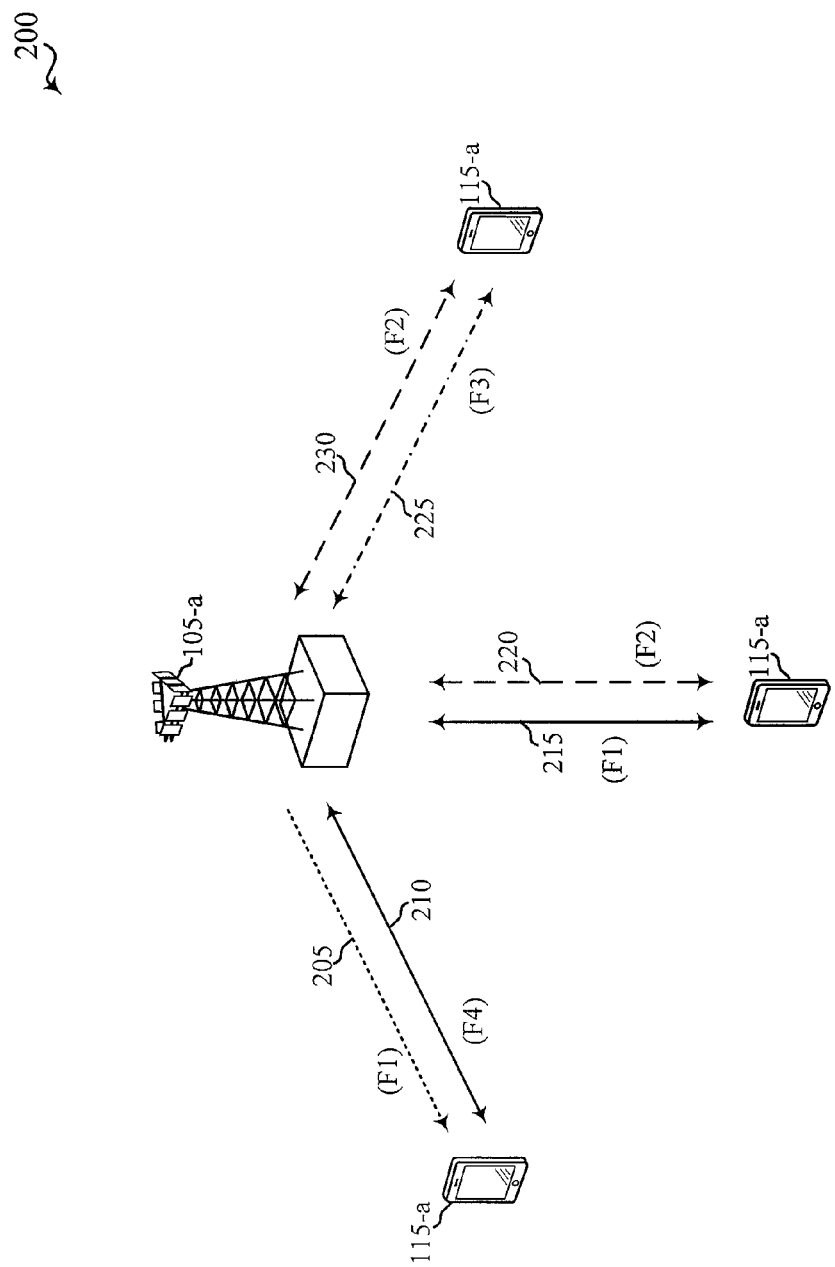
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
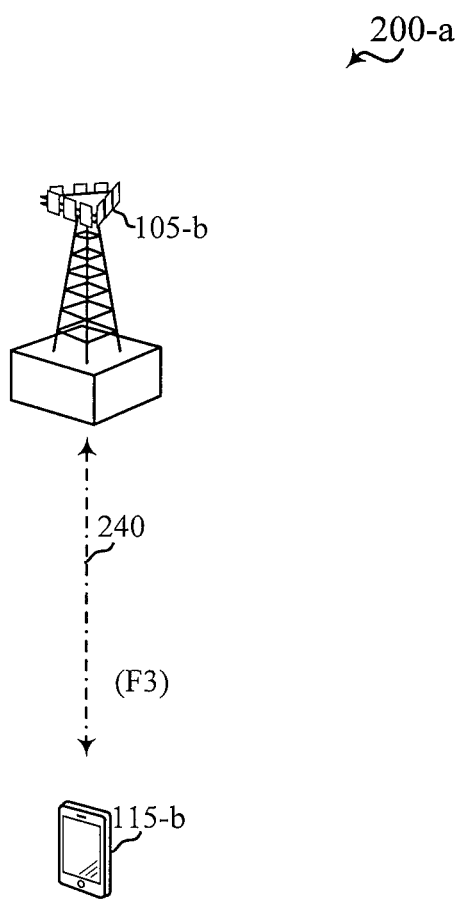
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
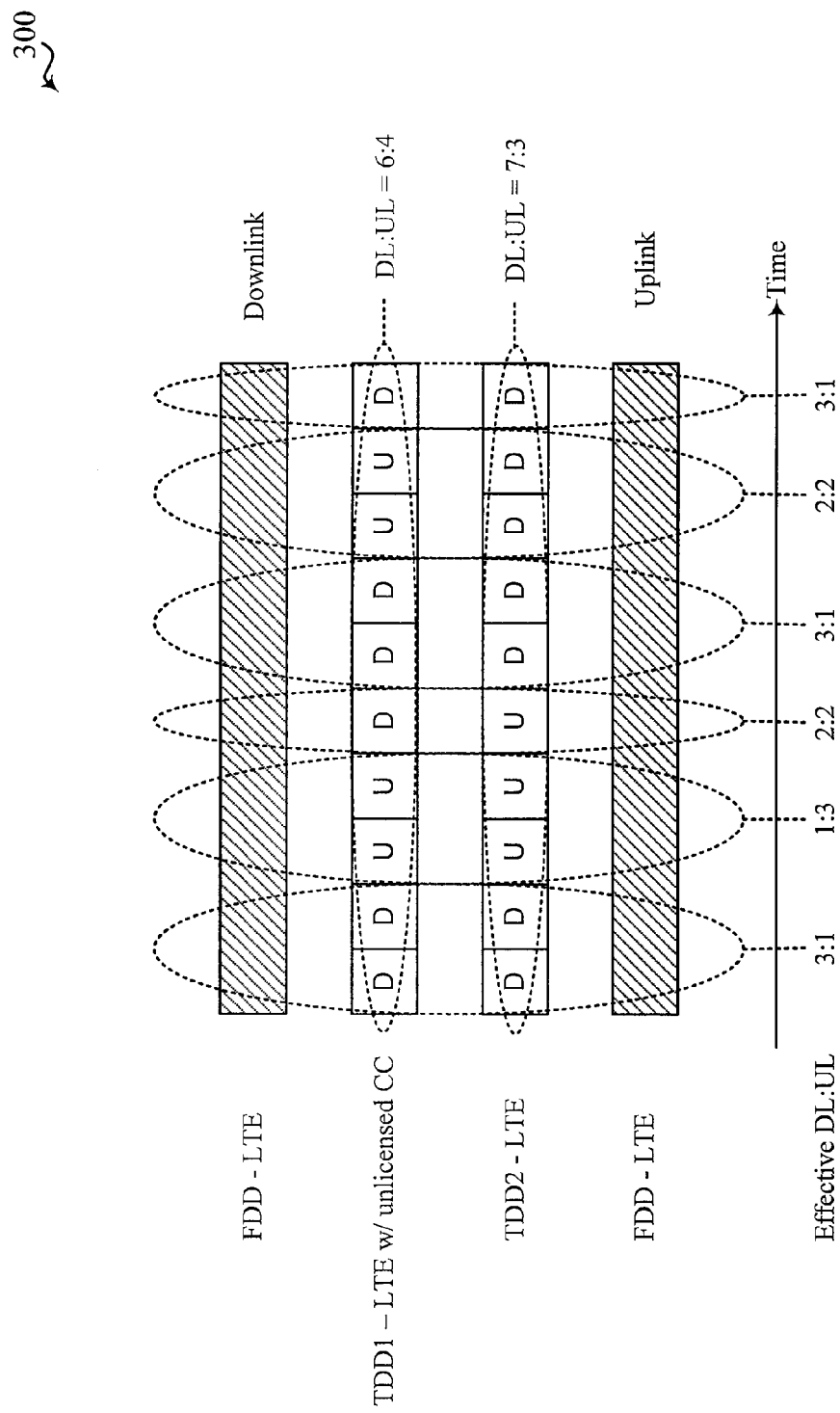
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
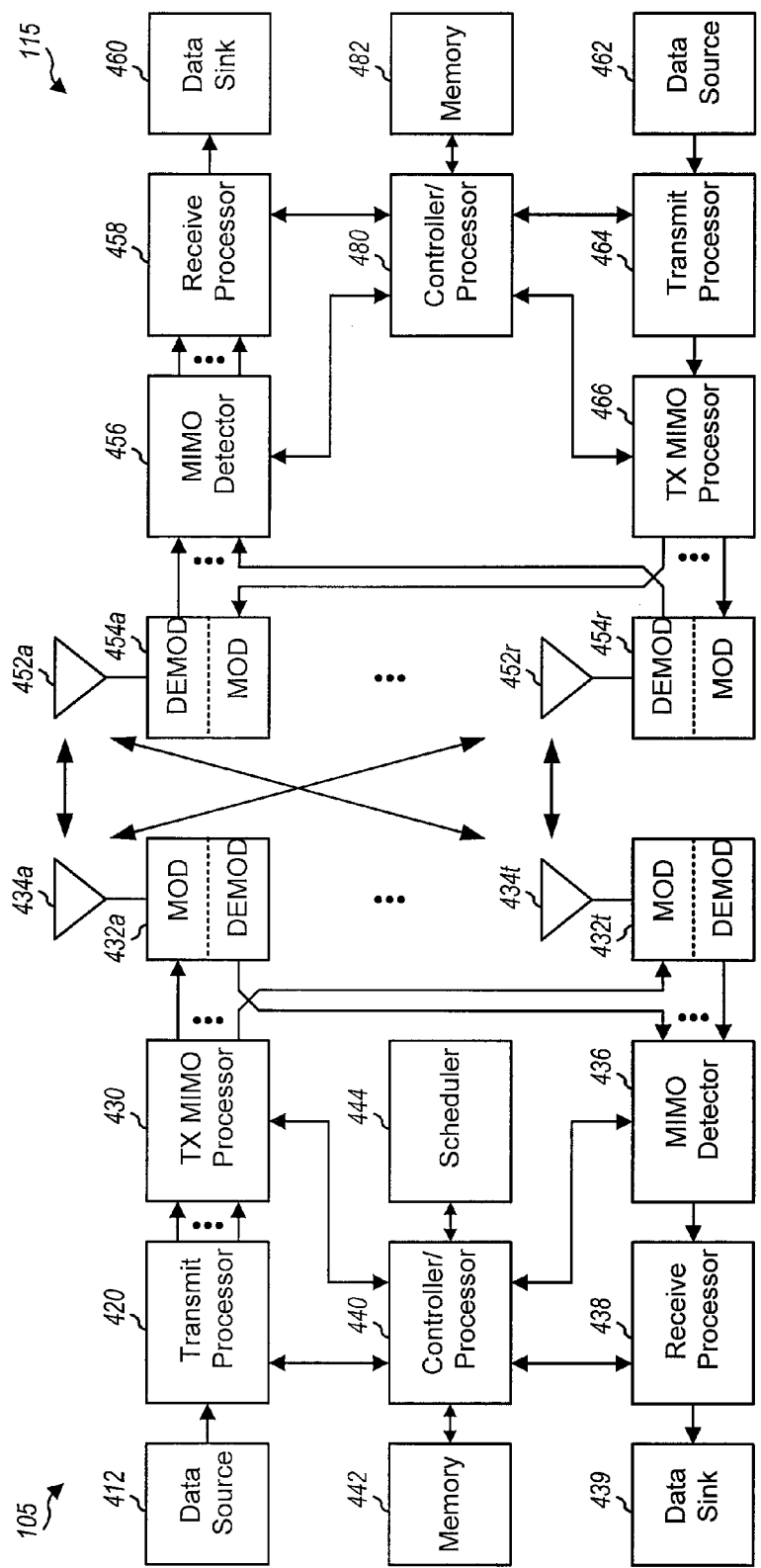
FIG. 4 is a block diagram illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434*a* through 434*t*, and the UE 115 may be equipped with antennas 452*a* through 452*r*. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 115, the antennas 452*a* through 452*r* may receive the downlink signals from the eNB 105 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 5A, 5B, and 8 and/or other processes for the techniques described herein. The memories 442 and 482 may store data and program codes for the eNB 105 and the UE 115, respectively. A scheduler 444 may schedule UEs for data transmission on the downlink and/or uplink.

In extending LTE/LTE-A to unlicensed spectrum, various additional constraints, such as the LBT requirements result in non-guaranteed transmissions over the unlicensed spectrum. With such constraints, considerations for CSI feedback, in general, and in fast feedback operations may be made in LTE/LTE-A systems with unlicensed spectrum.

In current LTE/LTE-A systems, CSI feedback may be based on a reference subframe for noise estimation in which the reference subframe is identified according to the equation n-M, where n represents the current subframe and M represents the number of subframes prior to the current subframe in which the reference subframe is located. For example, in typical LTE/LTE-A systems, M=4 or 5 subframes. Channel estimates for channel condition CSI feedback may also be determined with unconstrained channel measurement in current systems.

In order to compute the CSI feedback at the UE, the CSI feedback block receives two inputs: the channel estimate and the noise estimate. In fast CSI feedback, such as in transmit modes 3 or 4 (TM3/TM4) CSI reports in either periodic or wideband constraints may be generated with an overhead of approximately 20 μs when generated in hardware implementations or with an overhead of 30 μs when generated using software implementations.

As noted, LTE/LTE-A systems with unlicensed spectrum bring a number of new considerations for both channel and interference conditions. LTE/LTE-A systems with unlicensed spectrum may experience various additional interference sources. For example, Interference may originate from an unlicensed signal from the same or "serving" operator. Assuming synchronized operation within one operator, this interference may originate from either a eNB or UE or both. Unlicensed signals from different operators may also result in interference, and such interfering signals, as originating from different operators, may not be synchronized. Further, interference may be experienced from WiFi signals. Interfering WiFi signals may be asynchronous with respect to LTE/LTE-A systems with unlicensed spectrum. However, such WiFi signals may not impact LTE/LTE-A systems with unlicensed spectrum depending on the interactions between the LTE/LTE-A systems with unlicensed spectrum components and the WiFi devices.

In addition to differences in interference sources, LTE/LTE-A systems with unlicensed spectrum introduce new interference patterns. The LBT procedures may introduce more variables to the interference pattern. Thus, some interference patterns may depend on the joint distribution of CCA status for each LBT frame. Again, the interference may originate from either the same/serving or different operators. This is in addition to the variations in traffic patterns caused by the LBT procedures and non-guaranteed transmissions.

In order to address the additional sources and patterns of interference present in LTE/LTE-A networks with unlicensed spectrum, various configurations may differentiate between the source of interference when computing channel state information (CSI), whether interference from the same operator, from different operators, and from WiFi transmissions. When generating control signaling to accommodate the varying channel conditions, base stations may use knowledge of CCA results of neighboring base stations as well as a computation of interference that is not only reflective of current interference conditions, but also include interference experienced over a number of transmission or LBT subframes. Such interference information, as it depends on both current and historic interference values and probabilities is referred to herein as hysteretic interference information. The base station generates such control signaling based on such CCA results information, hysteretic interference information, and any combination of such either determined by the base station, received directly from the neighbor base stations via backhaul, or received in measurement reports from served UEs.

FIG. 5A is a functional block diagram illustrating example blocks executed at a base station. At block 500, a base station, such as base station 105 (FIG. 4), obtains CCA result information for a plurality of neighboring base stations. This CCA result information may be obtained directly from the neighboring base stations via backhaul, when such neighboring base stations are operated by the same mobile network operator (MNO). The CCA result information may also be estimated or determined based on listening for and detecting transmission signals indicative of CCA results, such as channel usage beacon signals (CUBS) and channel state information reference signals (CSI-RS) that may be transmitted from the neighboring base stations when CCA clearance has been obtained by those neighboring base stations. The estimated CCA result information may be determined by the base station or by various served UEs, which include this information in measurement reports transmitted to the serving base station.

At block 501, the base station generates control signaling for one or more of its served UEs using the CCA result information. When the base station, such as base station 105 knows the CCA result information, which may include the probabilities of the CCA results of the neighboring base stations over several transmission frames, the base station may intelligently select appropriate control signals for the UEs to accommodate or handle any interference that may be attributable to the neighboring base stations. For example, with knowledge of the CCA results information, the base station may select a suitable modulation coding scheme (MCS) for each of the served UEs. Once the control signaling is generated, then, at block 502, the base station transmits the generated control signaling to the appropriate UEs.

FIG. 5B is a functional block diagram illustrating example blocks executed by a UE. At block 503, a UE detects transmission signals indicative of CCA result information for a plurality of neighboring base stations. When a transmitting entity detects a clear CCA, it generally begins to transmit on the cleared channel immediately, using CUBS. Additionally, when base stations have cleared a channel with a successful CCA check, CSI-RS signals are transmitted to served UEs in order to obtain CSI feedback for controlling communications between the base station and particular UE.

At block 504, the UE determines CCA result information estimates for the neighboring base stations based on transmission signals indicative of the CCA result information. A UE, such as UE 115, may detect such signals, e.g., CUBS, CSI-RS, and the like, over the current frame or over multiple transmission frames in order to deduce or estimate CCA result probabilities for the neighboring base stations.

At block 505, the UE transmits a measurement report to its serving base station, wherein the measurement report includes the CCA result information estimates. Once the CCA results information has been estimated by the UE, the UE may include that information in a measurement report to the serving base station. The serving base station may then use that information on the additional interference resulting from the LTE/LTE-A communications with unlicensed spectrum to generate and assign appropriate control signaling for further UE communications.

Because deployment of LTE/LTE-A networks using unlicensed spectrum provides varying interference patterns from multiple potential sources, various scenarios may be experienced between locations of networks in which all neighbors are within the same MNO, or other locations where the neighbors may include base stations operated by other MNOs which may operate asynchronously from other MNO base stations and locations in which WiFi transmissions may arise either at dedicated WiFi locations or when different WiFi—capable devices begin transmitting in an ad hoc manner.

Figure 6A:
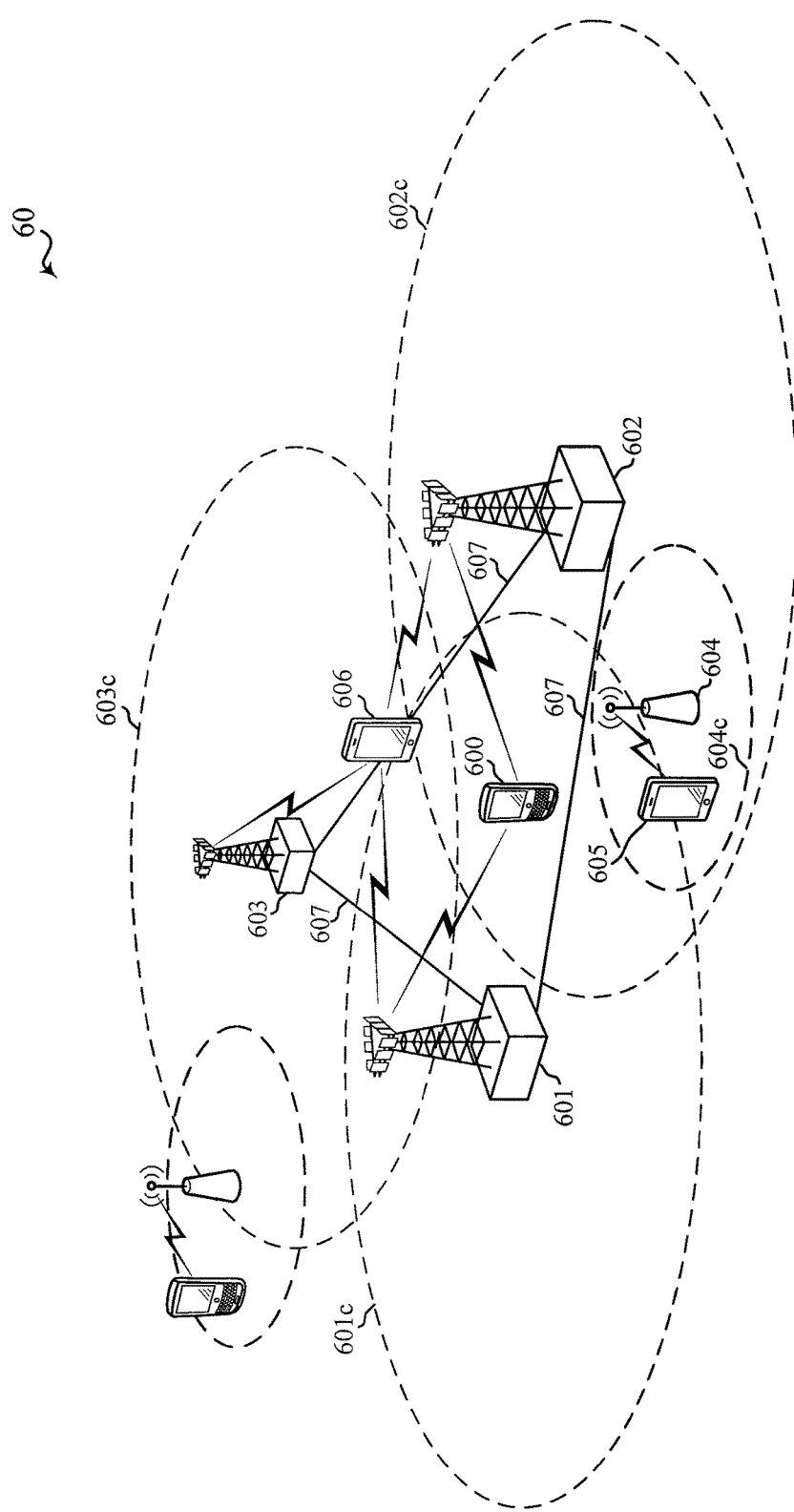
FIGS. 6A-6C are block diagrams illustrating multiple network scenarios illustrating aspects of the present disclosure.

FIG. 6A is a block diagram illustrating network location 60 of an LTE/LTE-A network including unlicensed spectrum. Network location 60 includes eNBs 601-603 each having coverage areas 601c-603c. eNBs 601-603 communicate with each other over backhaul 607. Network location 60 also reflects small eNB 604 with coverage area 604c. eNBs 601-603 and small eNB 604 are each operated by the same MNO and are synchronous with each other. Various user equipment, such as UEs 600, 605 and 606 are located within network location 60 and are served by eNBs 601-603 and small eNB 604, respectively.

In the LTE/LTE-A network with unlicensed spectrum deployed, the interference sources originate with signals from network entities within the same operator ("serving" operator). With the same MNO, synchronized operation may be assumed whether the interfering signals are transmitted from an eNB or UE or both. Because each transmitting entity in network location 60 uses the listen before talk (LBT) procedures, more variability is introduced into the potential interference patterns. For example, the interference pattern may depend on the joint distribution of CCA status for each LBT frame. This is in addition to the traffic pattern variation. For example, when a clear CCA status is obtained, one cleared eNB may not have as much data to transmit as another cleared eNB and, therefore, may transmit for fewer subframes than another cleared eNB.

It should be noted that eNBs that transmit using unlicensed spectrum would likely be smaller cell eNBs, such as femto, pico, or other relay/small cell-type base stations. Macro base stations may not typically use transmissions over unlicensed spectrum, but would more likely transmit using licensed spectrum. However, various implementations are not limited to the type of eNB or base station that may utilize unlicensed spectrum in LTE/LTE-A transmissions.

With respect LTE time division duplex (TDD) systems, different eNBs may use different TDD uplink (UL)/downlink (DL) subframe configurations. Thus, one neighbor base station at subframe 3 may be configured for downlink operations while another neighbor or the serving base station, at subframe 3, uses a different UL/DL subframe configuration and, as such, is configured for uplink operations. This transmission mismatch would also lead to interference.

If serving eNB knows CCA decisions from neighboring cells, it may select control signaling for served UEs in order to address the neighboring interference. For example, if eNB 601 knows the CCA decisions from the neighboring cells, eNBs 602-603 and small eNB 604, it may select the appropriate MCS for UE 600. Another example option may be for eNB 601 to select orthogonal demodulation reference signal (DM-RS) ports for pilot signals and select orthogonal precoders for transmission of data. This CCA decision information may be communicated directly from eNBs 602-603 via backhaul 607. Moreover, because eNBs 602 and 603 may provide dominant interference, each may not be active during the same LBT frame. Thus, multiple CSI hypotheses may be used for eNBs 602 and 603 over multiple LBT frames.

Additionally, eNB 601 may synthesize a noise estimate over different LBT frames based on CUBS or CSI-RS detected from eNBs 602-603 and small eNB 604. Based on these detected transmission indicative of CCA response information, a CCA response probability may be determined, which eNB 601 may use to generate appropriate control signals for UE 600.

It should be noted that, when generated over multiple transmission frames or LBT frames, the CCA response information may lose "spatial" resolution. That is, the specific locations and orientations of various interference sources would be averaged or normalized into probabilities instead of specific interference locations.

In additional implementations, if eNB 601 does not receive CCA decisions directly from its neighboring cells, such as eNBs 602-603 and small eNB 604, eNB 601 may rely on averaged CSI in order to schedule a UE, such UE 600. For example, the CSI computation may take into account the CCA results probability for the dominant interferences for noise estimates. Such a CCA probability may be determined by UE 600 through detection of CUBS, CSI-RS, or other signals in multiple LBT frames, if transmitted. When generated by a UE, such as UE 500, UE 500 would transmit the estimated CCA response probability information to eNB 601 in a measurement report. eNB 601 would then use the estimated CCA response probability information from the received measurement report.

Figure 6B:
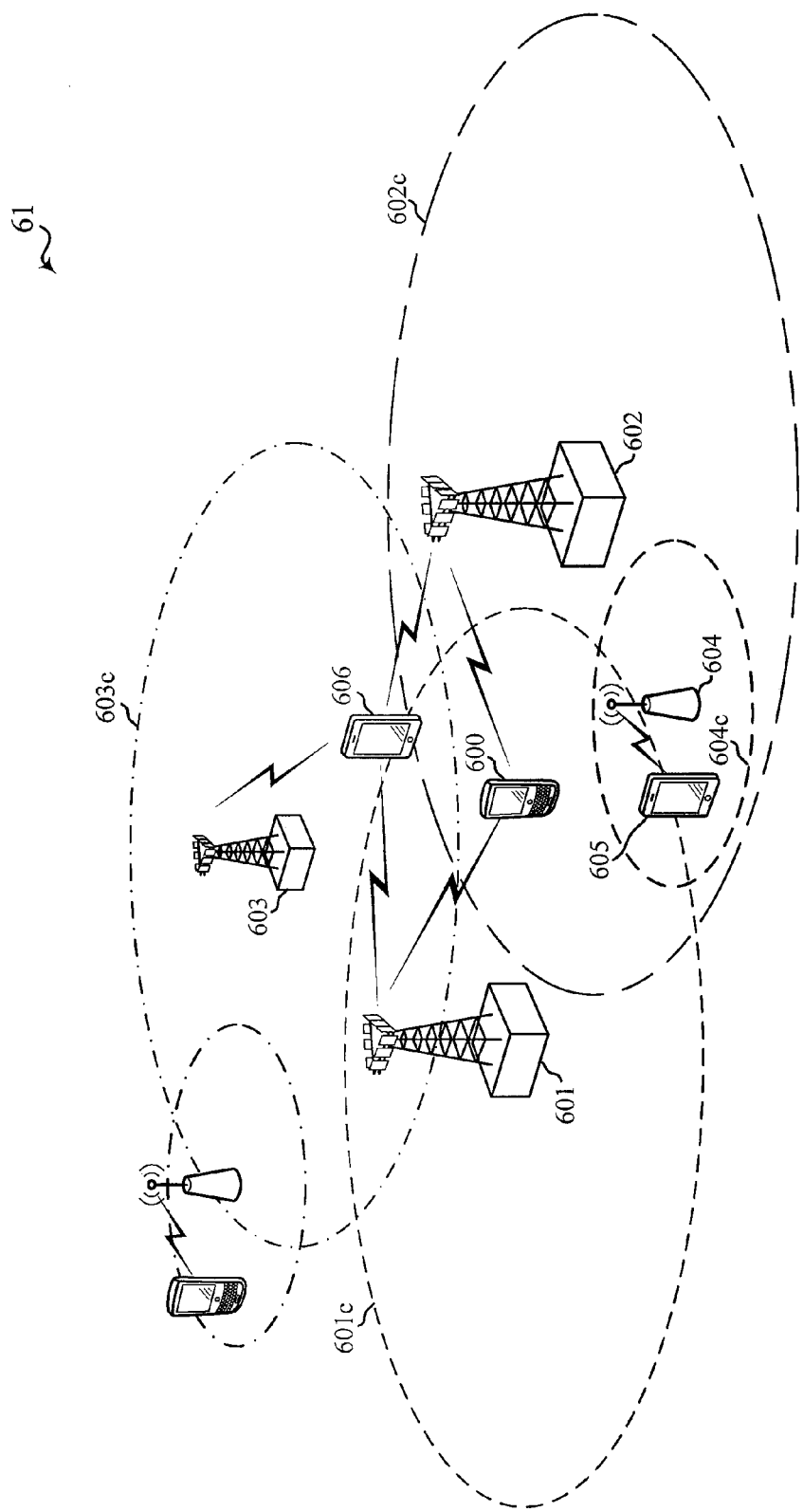

FIG. 6B is a block diagram illustrating network location 61 of an LTE/LTE-A network including unlicensed spectrum. For purposes of the example illustrated in FIG. 6B, the same elements are identified. However, eNB 602 belongs to a different MNO than eNB 601. Similarly, eNB 603 belongs to a different MNO than either of eNBs 601-602. Each of the networks operated by eNBs 601-603 are asynchronous from one another. In such network locations, such as network location 61, interference may originate from many different sources, such as network entities belonging to the MNO of eNB 601, and network entities belonging to the MNOs of eNBs 602 and 603. Interference originating from the different MNOs, such as from eNBs 602 and 603, includes transmissions from UE 605, which is connected to the MNO operated through eNB 602 and small eNB 604, as well as transmissions from eNB 602 and small eNB 604, and transmissions from UE 606, which is connected to the MNO operated through eNB 603, as well as transmissions from eNB 603. The interference from the network entities in the other MNOs is not synchronized with the MNO operated through eNB 601. Thus, additional processing may be performed for detecting various signals through the interfering transmissions.

In addition to the multiple different sources of interference, which may be asynchronous to one another, multiple interference patterns may be encountered. In LTE/LTE-A systems including unlicensed spectrum, the LBT procedures introduce more variables in interference pattern. The interference pattern may depend on the joint distribution of CCA status and results across each of the transmitting entities for each LBT frame, which may be from entities in the same MNO or across different asynchronous MNOs. As noted above with respect to FIG. 6A, this variation of interference pattern based on distribution of CCA results information would be in addition to traffic pattern variations which may arise because of different transmission loads, different TDD UL/DL configurations and the like.

For handling interference from synchronous sources within the same MNO, similar procedures to those described with regard to FIG. 6A may be used. For example, receiving CCA decisions at eNB 601 directly from the other eNBs over a backhaul or by determining the CCA results information based on observed or detected signals indicative of CCA results information. However, network location 61 illustrates three separate MNOs operated through eNBs 601-603, respectively, and no backhaul exists between the different eNBs of the different MNOs. Thus, for interference coming from the different eNBs of the different operators, an average or processed interference may be captured. As noted above, this hysteretic interference information is based not only on current interference measurements or detection, but on interference conditions detected over multiple LBT frames. This hysteretic interference information provides a CCA probability across the various neighboring base stations, such as eNBs 602-603 and small eNB 604.

Interference may be measured when a CCA failure occurs. Because the eNB, such as eNB 601 detects a CCA failure, it will not transmit. Thus, it may listen and measure interference from the neighboring base stations. In additional aspects, weights may be added to the interference to provide some intelligence to the interference measurements. The weights may accommodate for the variability of interference signals that may arise through failed and successful CCAs of the neighboring base stations. The weights may include information from the served UEs, such as UE 600, that identifies how the UE sees interference over multiple transmission subframes. Thus, if the interference probability information from the UE indicates that it experiences a higher percentage of interference from a neighboring eNB in another MNO, e.g., UE 600 seeing interference from eNB 602, the information may be used to modify the interfering signals from eNB 602 that are detected by eNB 601. Because eNB 602 is a further distance from eNB 601 than it is from UE 600, the measured or detected interference may be lower than that seen by UE 600. Therefore, eNB 601 may weight the detected interference using that interference probability information received from UE 600, perhaps in a measurement report or other uplink control signaling, in order to better reflect the actual interference that UE 600 more probably will see from eNB 602.

Using the hysteretic interference information either determined by the serving eNB, such as eNB 601, or as received from a served UE, such as UE 600, when measuring and processing the probability of interference seen over multiple transmission frames, the serving base station may determine the timing of the neighboring MNO and begin to understand the interaction between itself and the asynchronous MNO operated through eNB 603, for example.

Figure 6C:
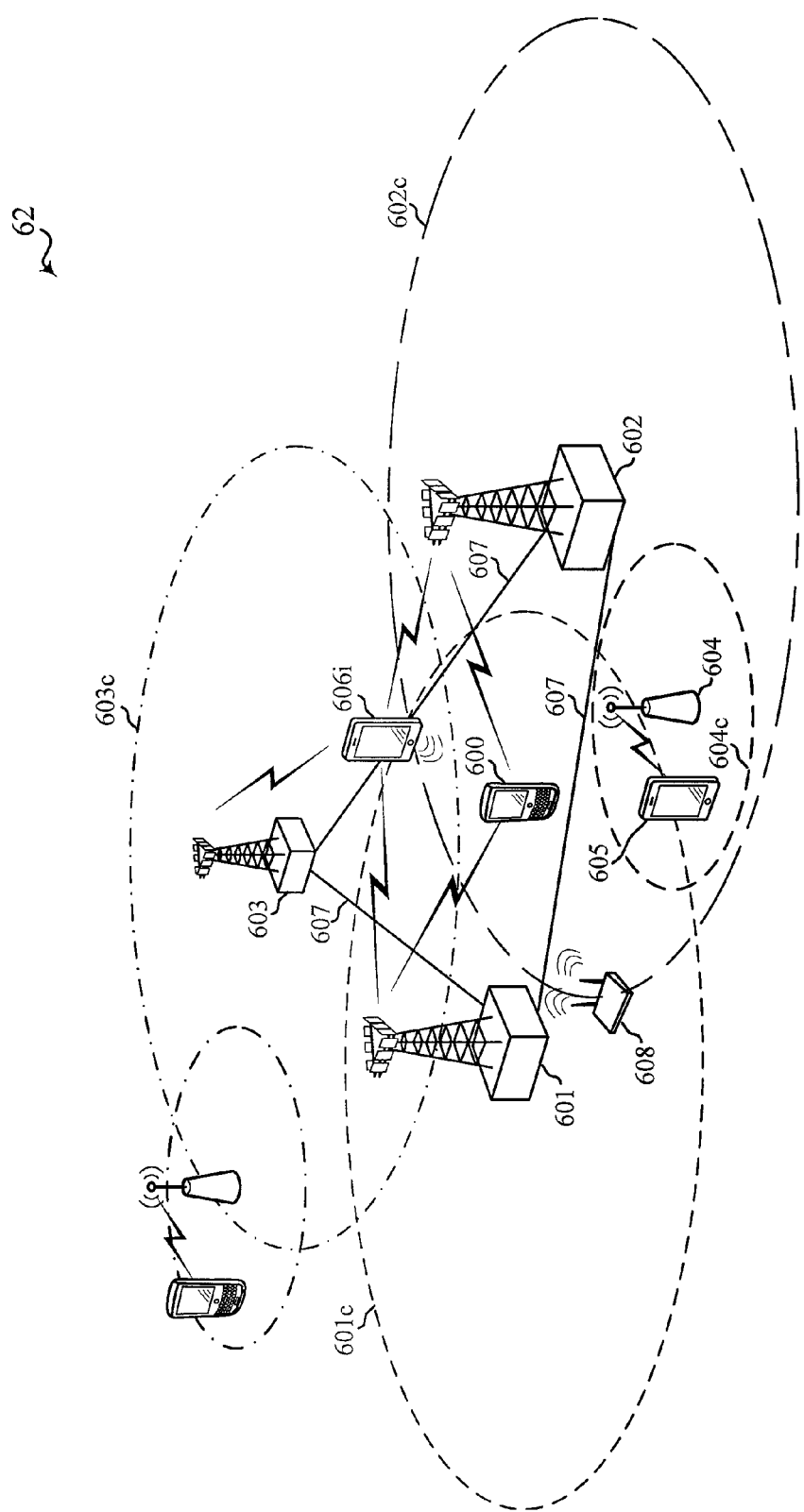

FIG. 6C is a block diagram illustrating network location 61 of an LTE/LTE-A network including unlicensed spectrum. For purposes of the example aspect illustrated in FIG. 6C, the same elements are identified. However, for the example illustrated in FIG. 6C, not only do eNBs 601-603 belongs to different MNOs, as shown in FIG. 6B, WiFi transmissions are present in network location 62 and provide interfering transmissions to UE 600. WiFi router 608 provides Internet access at a fixed location and UE 606*i* turns on the WiFi transmitter to access the Internet through another wireless WiFi router (not shown). Thus, interference may originate from network entities from the same operator, from different asynchronous operators, or also from the WiFi transmissions.

It should be noted that, depending on the interaction between the network entities associated with the LTE/LTE-A networks having unlicensed spectrum and the WiFi devices, there may be no interference impact to the LTE/LTE-A network with unlicensed spectrum.

The addition of WiFi signaling into the LTE/LTE-A network illustrated in FIG. 6B with eNBs from different MNOs may not change the variations to the interference pattern. For example, the interference pattern would again depend on the joint distribution of CCA status and results for each LBT frame and may originate from the same or different MNOs, in addition to the variable interference due to the traffic pattern variations between different transmitters. However, because WiFi signals are broadband, all data carrying WiFi subcarriers would be loaded. In LTE/LTE-A networks, signaling may be frequency selective depending on channel conditions and network loading. Thus, the interference pattern from WiFi signals could, in fact, causes differing interference patterns from LTE. Therefore, there is no guarantee that the variations to the interference pattern will not change based on WiFi transmissions.

For handling interference from synchronous sources within the same MNO, similar procedures to those described with regard to FIG. 6A may be used. For example, receiving CCA decisions at eNB 601 directly from the other eNBs over a backhaul or by determining the CCA results information based on observed or detected signals indicative of CCA results information. Interference seen from WiFi transmissions may be handled similarly to the interference originating from the different eNBs of the different operators, as illustrated and described in FIG. 6B. For example, for WiFi transmissions, an average or processed interference may be captured. As noted above, this hysteretic interference information is based not only on current interference measurements or detection, but on interference conditions detected over multiple LBT frames. This hysteretic interference information provides a more detailed summary of the interference that may be seen from fixed WiFi transmitters, such as from WiFi router 608, which may provide a more predictable or consistent interference, and from "hidden" WiFi sources, such as UE 606i, which will only transmit potentially interference WiFi signals, when the WiFi transmitter within UE 606i is activated. In one aspect, the WiFi interference may be separated from other unlicensed spectrum transmissions from network entities operating using LTE/LTE-A with unlicensed spectrum.

Figure 7A:
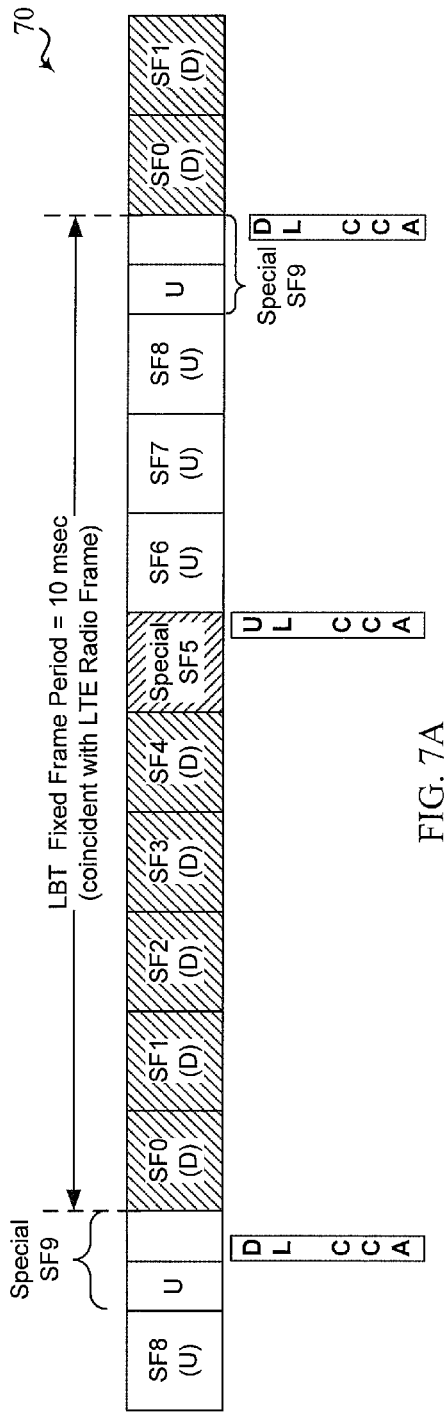
FIGS. 7A and 7B are block diagrams illustrating exemplary frame structures for LTE/LTE-A systems with shared unlicensed spectrum.

In LTE/LTE-A systems with shared unlicensed spectrum, LBT is used by a node before initiating transmissions. This system of using LBT procedures, such as CCA checks, provides a contention-based spectrum access solution for multiple entities competing for shared resources. FIG. 7A is a block diagram illustrating an exemplary frame structure 70 for LTE/LTE-A systems with shared unlicensed spectrum. Multiple CCA (clear channel assessment) opportunities may be available, which can be shared by different operators/cells. eNB and UE may perform CCA separately. For example, downlink CCA opportunities are illustrated at special subframes 9, Special SF9, and an uplink CCA opportunity is illustrated at special subframe 5, Special SF5. A node (eNB, UE, etc.) may also have CCA exempt transmissions (CETs). CCA checks are not necessary for all node transmissions. For example, a CCA check may not be necessary for autonomous transmissions subject to some regulatory requirements. A CET may happen regularly, e.g., every 60 ms, 80 ms, 100 ms, etc., with a duration of a fraction of a subframe. CET may also be present for both downlink and uplink transmissions. CET may carry necessary system information and other useful information (e.g., group power control, discovery reference signals, system information broadcast signals, etc.)

Figure 7B:
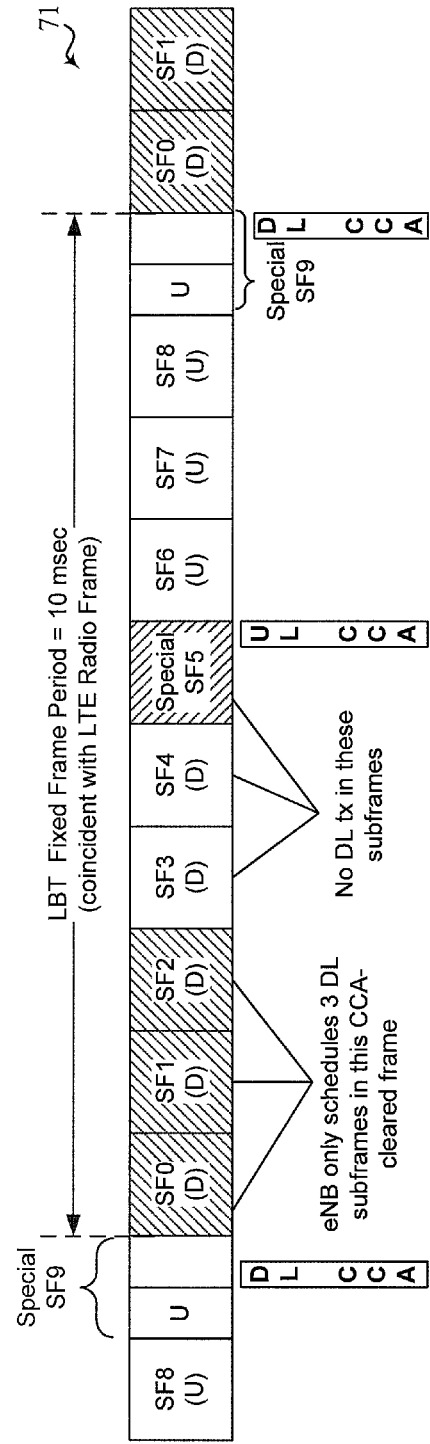

FIG. 7B is a block diagram illustrating an exemplary subframe configuration 71 for LTE/LTE-A systems with shared unlicensed spectrum. In each CCA cleared frame, the number of downlink subframes scheduled by a nodes in an LTE/LTE-A system with shared unlicensed spectrum may not always be the same as the number of available downlink subframes. This scheduling of fewer than the available number of downlink subframes may be due to a number of different reasons, such as, a limited downlink buffer, interference management, and the like. As illustrated in exemplary subframe configuration 71, the downlink CCA check occurring within the first Special SF9 is detected as clear, which clears each of the downlink subframes, SF0-SF4 and the downlink portion of Special SF5. However, the eNB associated with exemplary subframe configuration 71 only schedules downlink transmission in SF0-SF2, leaving SF3-SF4 and the downlink portion of Special SF5 cleared for eNB transmissions, but without any schedule traffic.

Interference measurement in LTE may be used for demodulation and/or CSI feedback. In LTE systems without shared unlicensed spectrum, interference measurement may be performed either based on a common reference signal (CRS) or based on an interference measurement resource ("IMR" or "CSI-IM"). In particular, IMR may be based on a zero-power (ZP) CSI-RS configuration. A ZP CSI-RS may be configured by RRC in a periodic manner, e.g., in units of 4 REs/PRB pair. A CSI-RS process may be associated with both a non-zero power (NZP) CSI-RS configuration and an IMR. A UE would measure a channel based on the NZP CSI-RS and would measure interference based on the IMR and then provide the corresponding channel state information feedback based on those measurements.

Various interference conditions may be experienced by nodes within and LTE/LTE-A system with contention-based shared resources. In a frame in which the CCA check did not clear, the downlink interference seen by a UE in the frame may originate from other operators, hidden nodes from WiFi, and different cells of the same operator. In a frame in which the CCA check did clear, the downlink interference seen by a UE in the frame may originate from hidden nodes of other operators, hidden nodes from WiFi, and different cells of the same operator. In a frame in which the CCA check can be cleared, but the eNB chooses not to transmit in the frame (e.g., due to empty buffer, or interference management), if the eNB performs a CCA check and transmits CUBS, the downlink interference seen by a UE in the frame may originate from hidden nodes of other operators, hidden nodes from WiFi, and different cells of the same operator. If the eNB chooses to not perform a CCA check or performs a successful CCA check but does not transmit CUBS, the downlink interference seen by a UE in the frame may originate from other operators, hidden nodes from WiFi, and different cells of the same operator.

Additionally, in a frame in which the CCA check is clear, and the eNB transmits in the frame, a node may choose to schedule only in a subset of downlink subframes. For example, the node may only schedule downlink transmissions in the first few downlink subframes, or in the middle downlink subframes, or in the last few downlink subframes. The non-scheduled downlink subframes are dynamic in nature depending the node's scheduling decisions. If the scheduling always starts from the $1^{st}$ subframe in the frame, and the scheduling is consecutive, earlier subframes may typically experience more interference than later subframes. Moreover, different subframes may experience different amounts of interference, especially in heterogeneous networks. While interference averaging over subframes helps improve interference measurement, blind averaging over all subframes may not be helpful and may, in fact, fail to accurately reflect actual subframe-varying interference conditions.

With the multiple various interference conditions experienced across various LBT scenarios, it may be beneficial to differentiate different interference conditions for the following cases: Category 1 includes cases in which no CUBS is transmitted by the node: Case 1: CCA is not performed and, thus, the frame is idle; Case 2: CCA is performed, but no CUBS is transmitted even if the CCA check is clear, and the frame is idle; Case 3: CCA is not cleared. Category 2 includes cases in which the node transmits a CUBS: Case 4: CCA is cleared, CUBS is transmitted, and the frame carries no downlink control or data transmissions, which may be motivated by better CSI feedback, transmission of UL grants, etc.; Case 5: CCA is cleared, CUBS is transmitted, and a subset of the available downlink subframes are scheduled for transmission; Case 6: CCA is cleared, CUBS is transmitted, and all downlink subframes are scheduled for transmission. With each of the cases in the two categories, it may be beneficial for a UE to determine whether NZP CSI-RS and/or ZP CSI-RS are available or not. Consideration may also be made as to whether there is a need to increase the time-domain presence of CSI-RS for interference measurement and how to implement such increase.

It should be noted that, in the case of coordinated multipoint (COMP) operation, the above CCA conditions may refer to one or more cells for a UE.

For interference measurement, UEs in Cases 1/2/3 may generally see statistically the same interference conditions. The downlink interference seen by a UE in the frame may originate from other operators, hidden nodes from WiFi, or different cells of the same operator. Case 3, in particular, may see different interference conditions, because the failure of the CCA check may be due to high interference caused by transmissions from other nodes. UEs in Cases 4/5/6 may also generally see statistically the same interference conditions. The downlink interference seen by a UE in such a frame in Cases 4/5/6 may originate from hidden nodes from other operators, hidden nodes from WiFi, or different cells of the same operator.

For channel measurement, Cases 1/2/3 will not carry NZP CSI-RS (or any other non-zero power reference signals, e.g., CUBS) for channel measurement. While Case 4 may or may not carry NZP CSI-RS for channel measurement, it may be beneficial to enable NZP CSI-RS in Case 4 for channel measurement to better facilitate DL scheduling in future frames, as the Case 4 eNB has cleared the CCA check but does not transmit downlink data. Case 5 also may or may not carry NZP CSI-RS for channel measurement depending on whether NZP CSI-RS is configured and on the set of scheduled downlink subframes. Case 6 will carry NZP CSI-RS for channel measurement if the NZP CSI-RS falls into the frame. Various aspects of the present disclosure are directed to differentiating between the different interference conditions and determining whether an NZP CSI-RS is transmitted in a frame when CCA for the frame is cleared and, thus, whether channel measurement is available.

Figure 8:
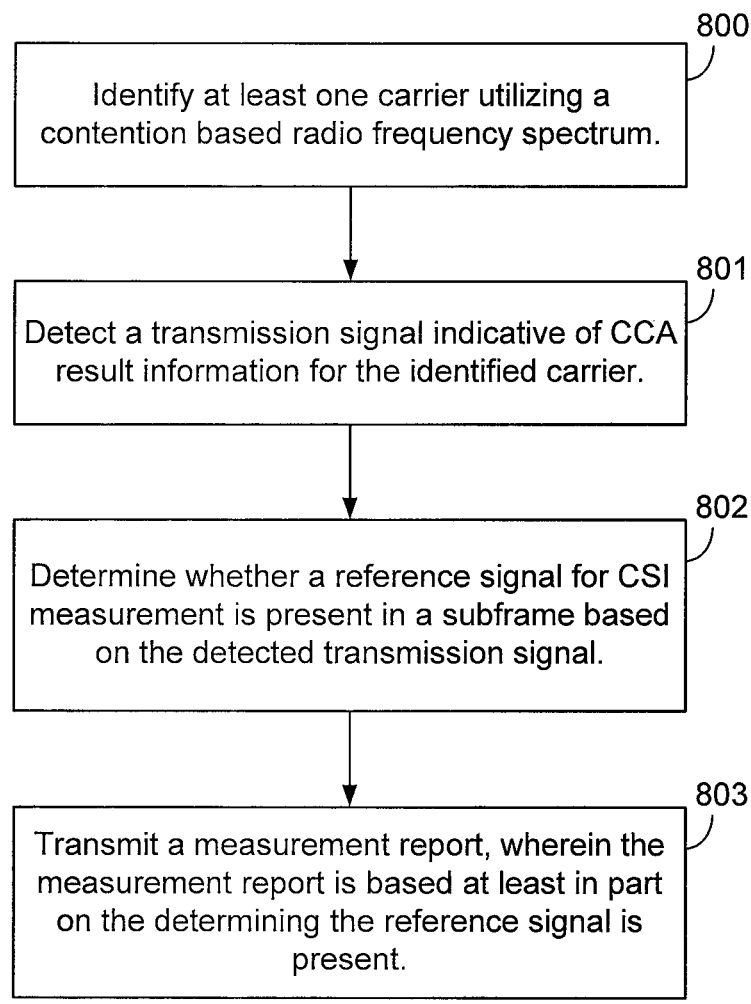
FIG. 8 is a block diagram illustrating example blocks executed to implement one aspect of the present disclosure.

FIG. 8 is a block diagram illustrating example blocks executed to implement one aspect of the present disclosure. At block 800, a UE identifies at least one carrier utilizing a contention-based radio frequency spectrum. For example, the UE may identify an LTE/LTE—A system with contention-based shared spectrum.

At block 801, the UE detects a transmission signal indicative of CCA result information for the identified carrier. For example, the UE may listen for and detect CUBS transmissions on an unlicensed spectrum that is part of the contention-based shared spectrum.

At block 802, the UE determines whether a reference signal available for channel state information measurement is present in a subframe based on the detected transmission signal. The determination of the presence of a CSI-RS, such as an IMR, ZP CSI-RS, or NZP CSI-RS (or any other non-zero power reference signals for channel measurement, e.g., CUBS) can be based on blind detection by the UE or on some explicit indication. If the UE detects the CUBS, at block 801, blind detection by the UE can be linked to the CUBs detection. Thus, if CUBS is transmitted and detected by the UE at block 801, the reference signal is determined to be present in the subframe. Otherwise, the UE will determine that the reference signal is not present. If present, the UE will perform measurements on the reference signal.

At block 803, the UE transmits a measurement report based at least in part on the determination that the reference signal is present. When the UE detects the CUBS, at block 801, it will determine the reference signal (e.g., IMR, ZP CSI-RS, NZP CSI-RS, etc.) is present and perform measurements using the reference signal. The measurement report will include the resulting measurements.

Figure 9:
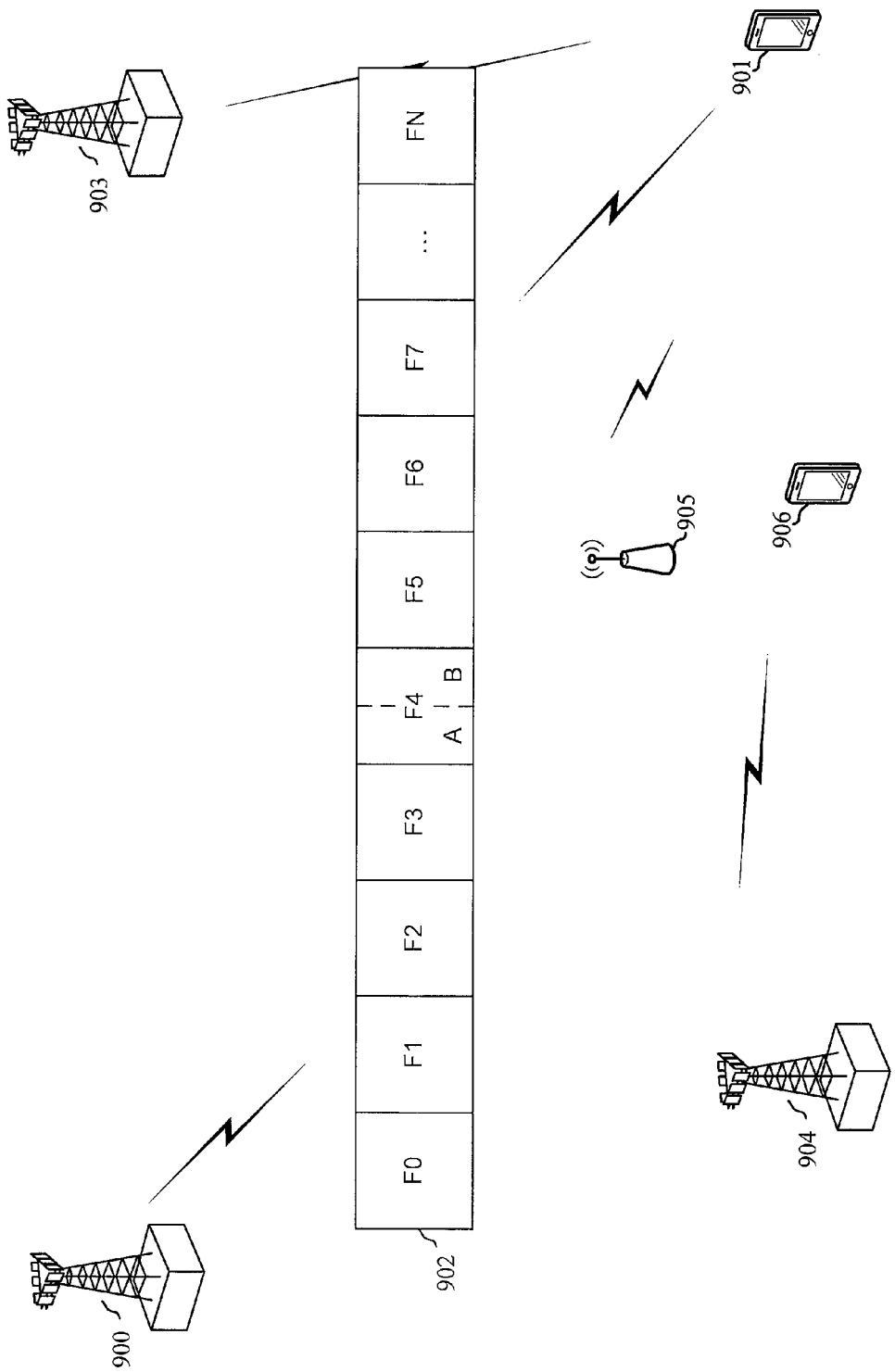
FIG. 9 is a block diagram illustrating a UE configured according to one aspect of the present disclosure.

If two or more CSI-RS processes are configured (e.g., for CoMP or enhanced interference mitigation and traffic adaptation (eIMTA)), separate determination for each CSI-RS process may become beneficial rather than joint determination. FIG. 9 is a block diagram illustrating a UE 901 configured according to one aspect of the present disclosure. UE 901 is served by base station 900. Communication stream 902 includes communication frames F0-FN providing for uplink and downlink communication subframes between base station 900 and UE 901. In one example aspect, base stations 903-905 join with base station 900 to provide CoMP operations to UE 901. In another example aspect, eIMTA operations are present in base stations 904-905. The eIMTA operations result in subframes transmitted in communications between base stations 904-905 and their respective UEs to dynamically change direction from uplink to downlink or from downlink to uplink. In each example aspect, multiple CSI-RS processes may be configured for the CoMP operations in the first example and for resulting eIMTA operations in the second example. Because, in the first CoMP example, CSI feedback may be beneficially used by base stations 903-905 for improving CoMP performance, UE 901 would separately measure and determine the CSI feedback for use by base stations 900 and 903-905. In the eIMTA example, because some of the subframes may dynamically change directions, UE 901 separates the CSI feedback due to uplink interference from CSI feedback due to downlink interference.

Moreover, if the reference signals are not available (e.g., if CUBS is not transmitted for a frame), the interference measurement may be omitted. For example, if base station 900 does not transmit CUBS in any of frames F0-FN, UE 901 would omit any interference measurement for those frames. If the interference is not measured in the frame, UE 901 may either omit CSI reporting entirely for the frame or report CSI based on previous measurements. When CUBS is not transmitted for a frame, the measured interference in the frame does not typically reflect the actual interference well. Thus, if interference is measured in a frame without CUBS transmission, the measured interference should not be filtered with interference measurements from frames when CUBS is transmitted.

It should be noted that, in additional aspects of the present disclosure, even if eNB 900 has nothing to transmit, it may still choose to transmit CUBS (Case 4) for proper interference measurement for a cell and its neighboring cells.

Instead of blind decoding of reference signals, such as NZP CSI-RS, IMR, ZP CSI-RS, etc., aspects of the present disclosure may also provide an explicit indication of the reference signal presence. For example, base station 900 may transmit a broadcast, groupcast, or unicast signal to UE 901 indicating whether or not the reference signal is present in the frame for the UE.

In another exemplary design of various aspects of the present disclosure, as long as CUBS is transmitted in a frame by base station 900, the reference signal will always be assumed present in the frame by UE 901. In such configurations, it may be beneficial to place the reference signal, such as NZP CSI-RS at the very beginning of the frame. For example, base station 900 may transmit the reference signal in the beginning portion, zone A, of SF4. Otherwise, if there is no other downlink traffic, it would waste resources for the reference signal to occupy the carrier. The reference signal occupying later portions of the frame, zone B of SF4, may also not be favorable if fast turn-around of CSI reporting is desired. In one implementation of such aspect, as long as CUBS is transmitted in a frame, the reference signal will always be transmitted if it is located in the first half (zone A) of the frame. For the $2^{nd}$ half (zone B) of the frame, if base station 900 does not schedule any downlink transmissions, the reference signal will not be transmitted. In one implementation of such aspect, as long as CUBS is transmitted in a frame, the reference signal will always be transmitted if it is located in the first subframe of the frame (F0).

In additional aspects of the present disclosure, base station 900 may transmit CUBS instead of, or in addition to, the reference signal. Such CUBS transmission may also be used by UE 901 for channel measurement, at least in Case 4. The CUBS used for CSI feedback can be limited to one or more CUBS transmissions, instead of all regular CUBS transmissions.

In LTE systems without contention-based shared unlicensed spectrum, CSI-RS are configured in a UE-specific manner. For LTE/LTE-A systems with contention-based shared unlicensed spectrum, CSI-RS may be configured in a cell-specific manner, for example, by providing CSI-RS in subframes 0 and 5 of each frame.

Figure 10:
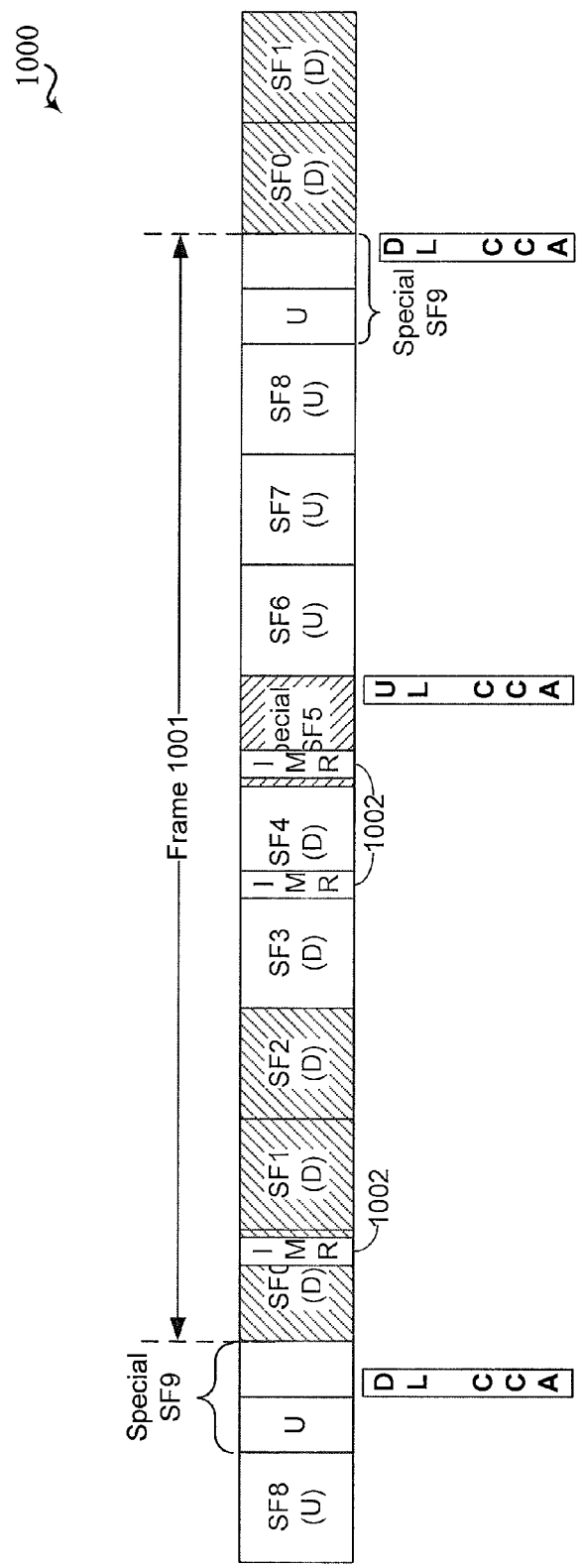
FIG. 10 is a block diagram illustrating a communication stream in a wireless communication system having contention-based shared unlicensed spectrum according to one aspect of the present disclosure.

Additional aspects of the present disclosure may provide for subframe-dependent interference measurement. FIG. 10 is a block diagram illustrating communication stream 1000 in a wireless communication system having contention-based shared unlicensed spectrum according to one aspect of the present disclosure. In frame 1001 when CCA is cleared after the downlink CCA opportunity of the first Special SF9, CSI may be calculated to reflect different amounts of interference in different subframes. The eNB (not shown) may transmit IMR 1002 in multiple subframes within frame 1001. As illustrated, IMR 1002 is transmitted within SF0, SF4, and Special SF5. A UE (not shown) may be configured or triggered to measure interference conditions separately for multiple parts of frame 1001. For example, the UE may be configured to measure interference conditions in the first part of frame 1001 using IMR 1002 at SF0 and in the later part of frame 1001 using IMR 1002 at Special SF5. Additionally, the UE may be configured to measure interference using IMR 1002 at SF4. Once measured, the UE can separately report interference for each measured portion of frame 1001.

It should be noted that, if all neighboring cells do not use the downlink portion of the special subframe, Special SF5, the interference captured in the downlink portion of Special SF5 by the UE would be completely due to WiFi, assuming synchronous deployments among different neighboring cells. In all other regular downlink subframes, such as SF0 and SF4, the interference captured using IMR 1002 would be due to both WiFi and regular inter-cell interference. Thus, it would not be desirable to average the measured interference between regular downlink subframes and the downlink portion of special subframes.

It may also be important to capture hidden node interference in the CSI report. If all neighboring nodes of the same operator have some common "blank" subframes, this would help pinpoint the hidden node interference especially due to WiFi. For example, referring back to FIG. 9, base station 905 may be a WiFi node that is hidden from general detection in the network including base stations 900, 903, and 904, and UE 901. A configuration in which all neighboring nodes refrain from transmission in the special subframes or some designated regular subframes of frames F0-FN would allow UE 901 to measure interference that would capture hidden node interference from hidden WiFi base station 905. Moreover, interference from WiFi nodes may be within a bandwidth smaller than the system bandwidth of LTE/LTE-A systems with contention-based shared unlicensed spectrum. If so, it may be desirable for UE 901 to distinguish subband-dependent interference by not averaging interference over different subbands. Alternatively, UE 901 may provide subband-dependent reporting.

Additional aspects of the present disclosure may provide for multiple IMR configurations provided for a particular UE. For example, one configuration for UE 901 may correspond to an earlier subframe in a frame (e.g., an earlier subframe in zone A of SF4), while another configuration may correspond to a later subframe in a frame (e.g., a later subframe in zone B of SF4), and the periodicity of the different IMR configurations across SF0-SFN may not necessarily be the same. The particular IMR configuration may be communicated to UE 901 via RRC configuration signals from base station 900. Different configurations may be communicated to UE 906 than those communicated to UE 901. Additionally, multiple IMRs with different configurations may occur within the same frame.

The IMR configuration may also be different for different subframe conditions in additional aspects. For example, an IMR configuration for a subframe when there is no other downlink traffic can be different from the subframe when there is other traffic. Referring to FIG. 9, subframes within zone B of SF4 may not be scheduled for downlink communications. Therefore, the configuration of reference signals, such as IMR in zone B of SF4 may be different from the reference signals in zone A of SF4, in which downlink communications are scheduled by base station 900. Additionally, when a subframe is determined to be empty, the UE may be configured to use the entire empty subframe for interference measurement. For example, with reference to FIG. 10, SF4 is an empty subframe without downlink transmission scheduled. Thus, a UE communicating using communication stream 1000 may use the entire length of SF4 for interference measurement. When reporting CSI for multiple CSI-RS processes associated with the multiple IMRs, the CSI reports may be either separately or jointly coded. In particular, subframe-differential coding for CSI feedback can also be provided in additional aspects of the disclosure. In one example aspect, a 4-bit CQI can be used for the CSI process associated with the first IMR configuration, and a 2-bit differential CQI can be used for the CSI process associated with the second IMR configuration. In another example aspect, the differential CQI can be such that the $2^{nd}$ CSI is 0 dB, 2 dB, 4 dB, and greater than 6 dB better than that of the $1^{st}$ CSI. For example, with reference to FIG. 10, a UE communicating using communication stream 1000 may feedback a full CSI report for measurements conducted in SF0 and feedback a differential CSI report for measurements conducted in SF4.

Unlike subframe interference encountered in LTE systems without contention-based shared unlicensed spectrum, interference variations within a subframe can be significant in LTE/LTE-A systems with contention-based shared unlicensed spectrum. Due to bursty WiFi interference and potentially also due to asynchronous operations and/or different frame structures among different operators, the interference experienced in different parts of a subframe may be significantly different.

In LTE systems without contention-based shared unlicensed spectrum, IMR per port spans only two symbols over the entire bandwidth. One aspect of the present disclosure provides for having more reference signals available in one LBT frame to capture bursty interference. Such additional CSI-RS may span substantially the entire subframe duration or, at least, all downlink symbols in special subframes for the reference signal. To reduce overhead in such aspects, a hopping pattern may be employed in different RBs, or a selective presence provided in designated RBs.

Figures 11A, 11B:
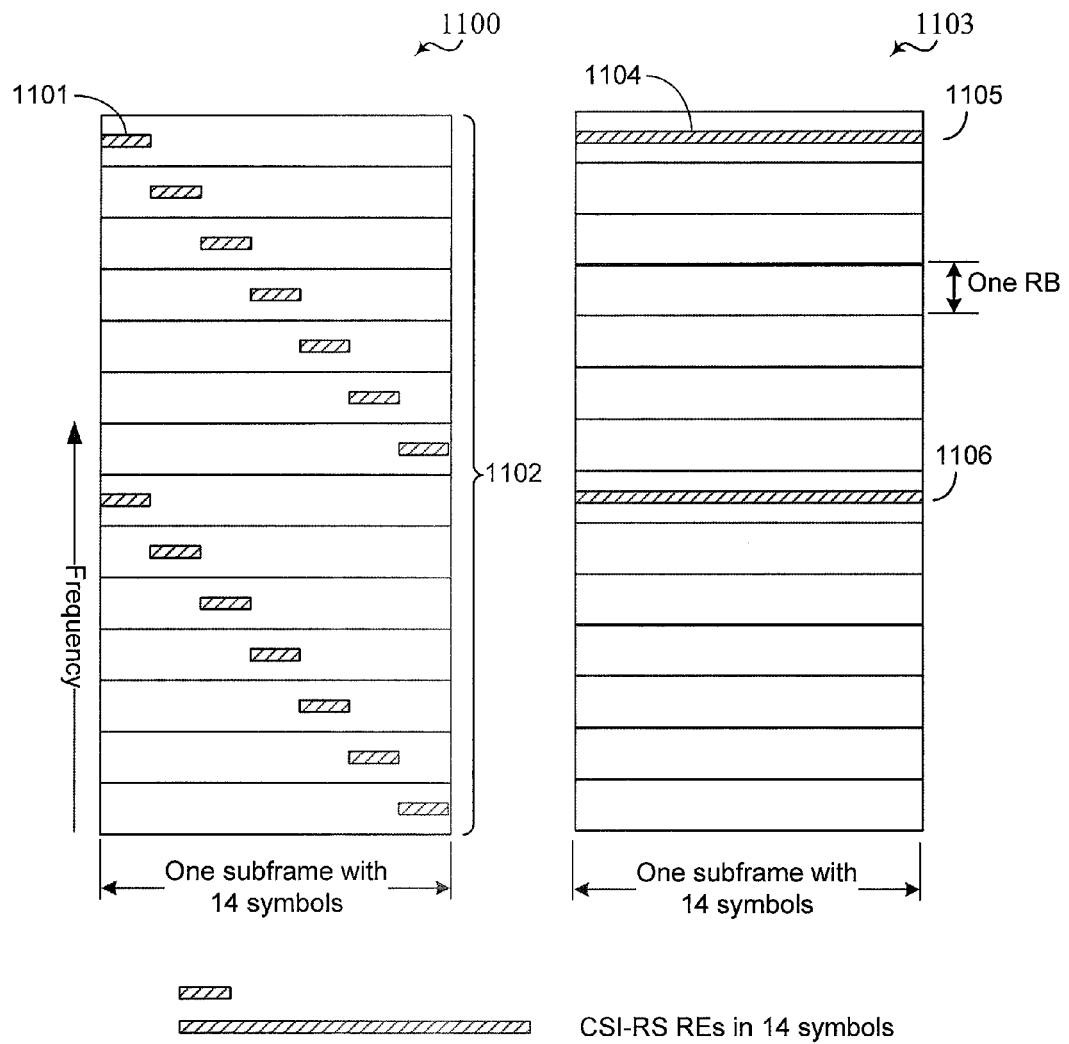
FIGS. 11A and 11B are block diagrams illustrating subframes configured according to aspects of the present disclosure.

FIGS. 11A and 11B are block diagrams illustrating subframes configured according to aspects of the present disclosure. In FIG. 11A, reference signals 1101 are transmitted by a base station across the entire frequency 1102 of subframe 1100. Reference signals 1101 are transmitted according to a hopping pattern across each frequency and symbol of subframe 1100. In FIG. 11B, reference signals 1104 are transmitted across each frequency of subframe 1103, but only across two RBs, RBs Y03-Y04. By providing for transmission of reference signals 1101 and 1104 across each symbol of subframes 1100 and 1103, a UE would be able to measure interference at more points across the time and frequency of a subframe, which may result in a more accurate measurement of bursty interference.

The CSI feedback provided by a UE may be in the form of averaged interference observed in the entire subframe, or symbol-dependent interference. In the latter case, interference variations within a subframe can be captured. For example, with reference FIGS. 11A and 11B, the UE may take measurements from the reference signals at different symbols within subframes 1100 and 1103, which may yield distinctly different interference. A UE, may transmit the report for different symbols either separately or jointly. The number of symbol-dependent interference reports can be equal to or less than the number of symbols in a subframe. For example, assuming 14 symbols per subframe, as illustrated in FIGS. 11A and 11B, two reports may be created, one report is the average interference over the first slot (the first 7 symbols), and the second report is the average interference over the second slot (the second symbols).

Although the discussion herein focuses on interference measurement for CSI feedback, similar design can be applied for interference estimation for control/data demodulation. For example, demodulation reference signal (DM-RS) for control (e.g., EPDCCH) and/or data channels (e.g., PDSCH) can adopt a similar design, such that the presence of the DM-RS is substantially over all symbols in a frame in order to capture interference more efficiently. Referring again to FIGS. 11A and 11B, in such an additional aspect, the reference signals transmitted in subframes 1100 and 1103, using either a hopping pattern (FIG. 11A) or a selective frequency presence (FIG. 11B), are DM-RS.

Aspects of the present disclosure as previously described assume that the operators and nodes of the same operator in LTE/LTE-A networks with shared unlicensed spectrum are synchronous to each other. As a result, if a node has cleared a CCA check and transmits CUBS, other operators should not transmit in the same frame, unless due to hidden node issues (e.g., the other operators' node does not sense enough interference from the node of interest). In asynchronous operations, however, some of the earlier solutions may not be applicable. For example, a later subframe in a frame may not necessarily see less interference than an earlier in the frame, as nodes from other operators may be more likely to grab and transmit in the later subframes. Additionally, the differential CSI reporting presented above may not apply because the CSI for a later subframe may not necessarily be better than the CSI of an earlier subframe in the same frame. In asynchronous scenarios, the interference captured during an empty subframe in a node may become more useful. Such interference measured during these empty subframes may reflect interference conditions due to asynchronous operations of other operators.

As noted above, eIMTA, which may be supported for LTE/LTE-A networks with contention-based shared unlicensed spectrum, provides capability for the frame structure in a cell to be dynamically changed up to on a per frame basis. Thus, different neighboring cells may also have different frame structures that change on a dynamic basis. As a result, the availability of a channel and/or interference measurement resource is subject to whether a corresponding subframe is indeed configured as a downlink subframe or an uplink subframe. The UE can determine the subframe direction via blind detection or via signaling from a base station, such as through a control channel. Upon determining that a subframe is an uplink subframe, the UE may omit performing channel and/or interference measurement for the subframe, and the corresponding report. If a neighboring cell has a different frame structure, it may be beneficial to capture the interference due to uplink transmissions in the neighboring cell. However, the interference measured based on a neighboring cell's uplink transmissions should not be averaged with interference measured based on a neighboring cell's downlink transmissions.

In additional aspects of the present disclosure, as previously noted, Cases 1/2/3 are generally deemed as cases that the UE should skip interference measurement. However, additional aspects of the present disclosure provide for the UE performing interference measurement for these cases where CUBS is not transmitted, such that, upon receipt of the corresponding CSI reports, the base station may still make use of this information. At least for asynchronous deployments, interference measured for such frames may still reflect actual interference. Additional aspects of the present disclosure may also provide for placing reference signals, such as IMR, ZP CSI-RS, NZP CSI-RS, etc., in a frame to emulate interference for future frames. That is, one frame may carry reference signals for one or more frames.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A, 5B, and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   identifying, by a user equipment (UE), at least one carrier utilizing a contention based access radio frequency spectrum;
   detecting a transmission signal indicative of clear channel assessment (CCA) result information for the at least one carrier, wherein the transmission signal indicative of CCA result information includes one or more channel usage reference signals transmitted, by one or more base stations, in response to successful listen before talk (LBT) performed on the at least one carrier by the one or more base stations;
   determining whether a reference signal for channel state information measurement is present in a subframe based on the detected transmission signal; and
   transmitting, by the UE, a measurement report, wherein the measurement report is based at least in part on the determining the reference signal is present.

2. The method of claim 1, wherein the transmission signal indicative of CCA result information is detected for a transmission frame comprising of a plurality of subframes, including the subframe in which the determining is performed.

3. The method of claim 1, wherein the one or more channel usage reference signals includes channel usage beacon signals (CUBS) or channel state information reference signals (CSI-RS).

4. The method of claim 1, further including:
   determining, by the UE, the reference signal presence over a plurality of transmission frames;
   processing interference conditions, as part of the measurement report, for a first set of transmission frames of the plurality of transmission frames in which the reference signal is determined to be present, separately from for a second set of frames in which the reference signal is determined to be absent.

5. The method of claim 1, further including:
   performing a first interference measurement for a first subframe in a transmission frame;
   performing a second interference measurement for a second subframe in the transmission frame; and
   transmitting a measurement report comprising a first measurement based on the first interference measurement and a second measurement based on the second interference measurement.

6. The method of claim 5, wherein the first subframe is a regular and the second subframe is a special subframe, wherein the first measurement is not averaged with the second measurement in the measurement report.

7. The method of claim 5, wherein the first subframe is configured with a first reference signal configuration and the second subframe is configured with a second reference signal configuration different from the first reference signal configuration.

8. The method of claim 1, further including performing interference measurement based on a set of resource elements present in substantially all symbols in the subframe.

9. The method of claim 8, wherein the set of resource elements are arranged in one of:
   a hopping pattern across each frequency of the subframe; or
   one or more predetermined frequencies of the subframe.

10. The method of claim 1, further including:
    transmitting a report indicative of the CCA result information over a predetermined duration for the at least one carrier.

11. The method of claim 1, wherein the carrier utilizing a contention based access radio frequency spectrum is in an unlicensed spectrum.

12. The method of claim 1, further including:
    determining, by the UE, there are two or more channel state feedback processes configured for the at least one carrier, wherein the determining the reference signal for channel measurement is performed separately for each of the two or more channel state feedback processes.

13. The method of claim 1, wherein the UE determines the reference signal is not present, the method further including one of:
    omitting, by the UE, the measurement report; or
    transmitting the measurement report, wherein the measurement report is based, at least in part, on a previous measurement report.

14. The method of claim 1, further including:
    receiving, by the UE, a presence signal, wherein the presence signal indicates whether the reference signal is present in the subframe.

15. The method of claim 1, further including:
    determining, by the UE, that the subframe is an empty subframe; and
    performing interference measurement, by the UE, over the entire subframe in response to the determining the reference signal is present.

16. The method of claim 1, further including:
    performing a first interference measurement for a first subframe in a transmission frame;
    performing a second interference measurement for a second subframe in the transmission frame;
    transmitting a first measurement report associated with the first interference measurement; and
    transmitting a second measurement report associated with the second interference measurement, wherein the second measurement report provides a differential between the second interference measurement and the first interference measurement.

17. The method of claim 1, further including:
    generating, by the UE, the measurement report, wherein the measurement report includes feedback of interference based on one of:
        averaged interference observed by the UE over a duration of the subframe; or
        symbol-dependent interference associated with one or more symbols of the subframe.

18. The method of claim 17, wherein the feedback of interference is based on symbol-dependent interference, the generating further including:
    averaging first symbols interference observed by the UE over each symbol of a first slot of the subframe; and
    averaging second symbols interference observed by the UE over each symbol of a second slot of the subframe, wherein one or more of the first symbols interference and the second symbols interference is included in the measurement report.

19. The method of claim 1, further including:
    determining the subframe is an uplink subframe; and
    omitting the detecting, determining, and transmitting in response to the determining the subframe is the uplink subframe.

20. The method of claim 1, further including:
    measuring, by the UE, interference in the subframe when a corresponding CCA is not cleared; and
    transmitting the measurement report, wherein the measurement report is based at least in part on the measured interference in the subframe.

21. The method of claim 1, where the reference signal is at least one of a non-zero-power channel state information reference signal (CSI-RS) or a zero-power CSI-RS.

22. The method of claim 21, wherein the non-zero CSI-RS is for a channel measurement of the CSI feedback and the zero CSI-RS is for an interference measurement of the CSI feedback.

23. The method of claim 1, wherein a non-zero-power reference signal is determined to be present in a subframe if a corresponding CCA is cleared.

24. The method of claim 1, wherein a zero-power reference signal is determined to be present in a subframe irrespective of whether a corresponding CCA is cleared or not.

25. An apparatus configured for wireless communication, comprising:
    means for identifying, by a user equipment (UE), at least one carrier utilizing a contention based access radio frequency spectrum;
    means for detecting a transmission signal indicative of clear channel assessment (CCA) result information for the at least one carrier, wherein the transmission signal indicative of CCA result information includes one or more channel usage reference signals transmitted, by one or more base stations, in response to successful listen before talk (LBT) performed on the at least one carrier by the one or more base stations;
    means for determining whether a reference signal for channel state information measurement is present in a subframe based on the detected transmission signal; and
    means for transmitting, by the UE, a measurement report, wherein the measurement report is based at least in part on the determining the reference signal is present.

26. A non-transitory computer-readable medium having program code recorded thereon, the program code including:
    program code for causing a computer to identify, by a user equipment (UE), at least one carrier utilizing a contention based access radio frequency spectrum;
    program code for causing the computer to detect a transmission signal indicative of clear channel assessment (CCA) result information for the at least one carrier, wherein the transmission signal indicative of CCA result information includes one or more channel usage reference signals transmitted, by one or more base stations, in response to successful listen before talk (LBT) performed on the at least one carrier by the one or more base stations;
    program code for causing the computer to determine whether a reference signal for channel state information measurement is present in a subframe based on the detected transmission signal; and program code for causing the computer to transmit, by the UE, a measurement report, wherein the measurement report is based at least in part on the determining the reference signal is present.

27. An apparatus configured for wireless communication, the apparatus comprising:
    at least one processor; and
    a memory coupled to the at least one processor,
    wherein the at least one processor is configured:
        to identifying, by a user equipment (UE), at least one carrier utilizing a contention based access radio frequency spectrum;
        to detect a transmission signal indicative of clear channel assessment (CCA) result information for the at least one carrier, wherein the transmission signal indicative of CCA result information includes one or more channel usage reference signals transmitted, by one or more base stations, in response to successful listen before talk (LBT) performed on the at least on carrier by the one or more base stations;
        to determine whether a reference signal for channel state information measurement is present in a subframe based on the detected transmission signal; and
        to transmit, by the UE, a measurement report, wherein the measurement report is based at least in part on the determining the reference signal is present.

28. The apparatus of claim 27, wherein the transmission signal indicative of CCA result information is detected for a transmission frame comprising of a plurality of subframes, including the subframe in which the determining is performed.

29. The apparatus of claim 27, further including configuration of the at least one processor:
    to determine, by the UE, the reference signal presence over a plurality of transmission frames;
    to process interference conditions, as part of the measurement report, for a first set of transmission frames of the plurality of transmission frames in which the reference signal is determined to be present, separately from for a second set of frames in which the reference signal is determined to be absent.

30. The apparatus of claim 27, further including configuration of the at least one processor:
    to perform a first interference measurement for a first subframe in a transmission frame;
    to perform a second interference measurement for a second subframe in the transmission frame; and
    to transmit a measurement report comprising a first measurement based on the first interference measurement and a second measurement based on the second interference measurement.

* * * * *